0
(12) United States Patent
Kim et al.

(10) Patent No.: US 11,533,758 B2
(45) Date of Patent: Dec. 20, 2022

(54) METHOD FOR TRANSMITTING AND RECEIVING UPLINK DATA BETWEEN TERMINAL AND BASE STATION IN WIRELESS COMMUNICATION SYSTEM AND DEVICE SUPPORTING SAME

(71) Applicant: LG Electronics Inc., Seoul (KR)

(72) Inventors: Seonwook Kim, Seoul (KR); Changhwan Park, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/651,093

(22) PCT Filed: Sep. 27, 2018

(86) PCT No.: PCT/KR2018/011411
§ 371 (c)(1),
(2) Date: Mar. 26, 2020

(87) PCT Pub. No.: WO2019/066481
PCT Pub. Date: Apr. 4, 2019

(65) Prior Publication Data
US 2020/0245364 A1  Jul. 30, 2020

Related U.S. Application Data

(60) Provisional application No. 62/620,404, filed on Jan. 22, 2018, provisional application No. 62/564,189, filed on Sep. 27, 2017.

(30) Foreign Application Priority Data

Aug. 9, 2018 (KR) .................. 10-2018-0092771

(51) Int. Cl.
*H04W 4/00* (2018.01)
*H04W 74/08* (2009.01)
*H04L 5/00* (2006.01)

(52) U.S. Cl.
CPC ....... *H04W 74/0833* (2013.01); *H04L 5/0048* (2013.01)

(58) Field of Classification Search
CPC .................. H04W 74/0833; H04L 5/0048
USPC ....................................... 370/329
See application file for complete search history.

(56) References Cited

U.S. PATENT DOCUMENTS

| | | | |
|---|---|---|---|
| 2010/0246472 A1* | 9/2010 | Wu | H04L 1/1812 370/315 |
| 2011/0013615 A1 | 1/2011 | Lee et al. | |
| 2011/0128909 A1* | 6/2011 | Luo | H04L 5/0023 370/328 |
| 2012/0106501 A1 | 5/2012 | Kishiyama et al. | |

(Continued)

OTHER PUBLICATIONS

International Search Report in International Appln. No. PCT/KR2018/011411, dated Dec. 26, 2018, 23 pages.

*Primary Examiner* — Maharishi V Khirodhar
(74) *Attorney, Agent, or Firm* — Fish & Richardson P.C.

(57) ABSTRACT

Systems and techniques for transmitting and receiving uplink data between a terminal and a base station in a wireless communication system. In sonic implementations, a user equipment may transmit an uplink data signal of a predetermined symbol duration N times repeatedly before signal synchronization with a base station, where N is a natural number equal to or greater than 2.

15 Claims, 23 Drawing Sheets

| Sym #0 | Sym #1 | Sym #2 | Sym #3 | Sym #4 | Sym #5 | Sym #6 | Sym #7 | Sym #8 | Sym #9 | Sym #10 | Sym #11 | Sym #12 | Sym #13 |
|---|---|---|---|---|---|---|---|---|---|---|---|---|---|
| CP | CP | CP | CP | CP | CP | CP | CP | CP | CP | CP | CP | CP | CP |
| CP A0 | CP A0 | CP A0 | CP A0 | CP A0 | CP A0 | CP A0 | CP A0 | CP A0 | CP A0 | CP A0 | CP A0 | CP A0 | CP A0 |
| CP A1 A1 | CP A1 A1 | CP A1 A1 | CP A1 A1 | CP A1 A1 | CP A1 A1 | CP A1 A1 | | | | | | | |
| CP B1 B1 | CP B1 B1 | CP B1 B1 | CP B1 B1 | CP B1 B1 | CP B1 B1 | CP B1 B1 | | | | | | | |

←――――――――――――――――― Slot ―――――――――――――――――→

(56) References Cited

U.S. PATENT DOCUMENTS

| | | |
|---|---|---|
| 2012/0300681 A1 | 11/2012 | Ji et al. |
| 2016/0095105 A1 | 3/2016 | Chen et al. |
| 2016/0234763 A1* | 8/2016 | Um .................... H04L 5/0007 |
| 2016/0295631 A1* | 10/2016 | Gubeskys ............. H04W 76/15 |
| 2017/0373810 A1* | 12/2017 | Wang ................... H04L 5/0053 |
| 2019/0020455 A1* | 1/2019 | Yamamoto .......... H04L 25/0224 |
| 2021/0100036 A1* | 4/2021 | Kim ........................ H04L 1/18 |
| 2021/0143962 A1* | 5/2021 | Jiang .................... H04L 5/0051 |

* cited by examiner

-Prior Art-

-Prior Art-

-Prior Art-

-Prior Art-

-*Prior Art*-

METHOD FOR TRANSMITTING AND RECEIVING UPLINK DATA BETWEEN TERMINAL AND BASE STATION IN WIRELESS COMMUNICATION SYSTEM AND DEVICE SUPPORTING SAME

CROSS-REFERENCE TO RELATED APPLICATIONS

This application is a National Stage application under 35 U.S.C. § 371 of International Application No. PCT/KR2018/011411, filed on Sep. 27, 2018, which claims the benefit of Korean Application No. 10-2018-0092771, filed on Aug. 9, 2018, U.S. Provisional Application No. 62/620,404, filed on Jan. 22, 2018, and U.S. Provisional Application No. 62/564,189, filed on Sep. 27, 2017. The disclosures of the prior applications are incorporated by reference in their entirety.

TECHNICAL FIELD

The present disclosure relates to a wireless communication system, and more particularly, to a method and apparatus for transmitting and receiving uplink data between a user equipment (UE) and a base station (BS) in a wireless communication system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

DISCLOSURE

Technical Problem

An aspect of the present disclosure is to provide a method and apparatus for transmitting and receiving uplink data between a user equipment (UE) and a base station (BS) in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for transmitting and receiving uplink data between a user equipment (UE) and a base station (BS) in a wireless communication system.

In one aspect of the present disclosure, a method of transmitting uplink data to a BS by a UE in a wireless communication system includes transmitting an uplink data signal of a predetermined symbol duration N times repeatedly before signal synchronization with the BS. N is a natural number equal to or larger than 2.

The predetermined symbol duration may be a 1-symbol duration.

Additionally, the uplink data signal may include uplink data information and a demodulation reference signal (DM-RS) by frequency division multiplexing (FDM) method.

N may be determined based on a predetermined rule or configured by higher-layer signaling.

According to some embodiments of the present disclosure, the uplink data signal may be transmitted without a cyclic prefix.

Based on the uplink data signal being an uplink signal for random access, the UE may transmit the uplink data signal and a physical random access channel (PRACH) preamble by the FDM method or time division multiplexing (TDM) method.

For example, based on the uplink data signal being an uplink signal for random access and being transmitted with the PRACH preamble by the FDM method, a frequency spacing between the uplink data signal and the PRACH preamble may be determined based on a predetermined rule.

In another example, based on the uplink data signal being an uplink signal for random access and being transmitted with the PRACH preamble by the FDM method, the uplink data signal and the PRACH preamble may be transmitted based on the same cyclic prefix and the same symbol repetition number.

In another example, based on the uplink data signal being an uplink signal for random access and being transmitted with the PRACH preamble by the FDM method, the uplink data signal may be transmitted frequency-hopped with respect to an $M^{th}$ repeated transmission time, and M may be a natural number smaller than N.

In another example, based on the uplink data signal being an uplink signal for random access and being transmitted with the PRACH preamble by the TDM method, a frequency spacing between the uplink data signal and the PRACH preamble may be determined based on a predetermined rule.

In the present disclosure, the UE may transmit the uplink data signal and the PRACH preamble by the FDM method or the TDM method based on a transmission power value of the PRACH preamble.

Alternatively, the uplink data signal and the PRACH preamble may be transmitted by the FDM method or the TDM method based on a measured reference signal received power (RSRP) value.

Alternatively, the uplink data signal and the PRACH preamble may be transmitted by the FDM method or the TDM method based on a higher-layer signaled configuration.

In another embodiment of the present disclosure, based on the uplink data signal being transmitted in an unlicensed band, the UE may transmit the uplink data signal of the predetermined symbol duration N times repeatedly in the unlicensed band based on a channel access procedure (CAP) for the unlicensed band.

In another aspect of the present disclosure, a UE for transmitting uplink data to a BS in a wireless communication system includes a transmitter, a receiver, and a processor operatively coupled to the transmitter and the receiver. The processor is configured to control the transmitter to transmit an uplink data signal of a predetermined symbol duration N times repeatedly before signal synchronization with the BS, and N is a natural number equal to or larger than 2.

In another aspect of the present disclosure, a method of receiving uplink data from a UE by a BS in a wireless communication system includes receiving, from the UE, an uplink data signal of a predetermined symbol duration transmitted N times repeatedly, before signal synchronization with the UE, and decoding the uplink data from the received uplink data signal based on a fast Fourier transform (FFT) operation. The FFT operation is performed based on a symbol boundary configured for the BS.

The above-described aspects of the present disclosure are merely some of the examples of the present disclosure, and various examples reflecting the technical features of the present disclosure may be derived and understood by those skilled in the art based on the detailed description of the disclosure.

Advantageous Effects

According to examples of the present disclosure, the following effects may be obtained.

According to the present disclosure, a user equipment (UE) may transmit an uplink signal (e.g., uplink data) to a base station (BS) without acquiring signal synchronization with the BS.

Particularly, the uplink signal transmission method is applicable to uplink data transmission for random access (e.g., transmission of message 3 (Msg3) for random access).

Further, compared to the conventional technology, a random access procedure in a licensed band or an unlicensed band may include two steps by applying the uplink signal transmission method proposed in the present disclosure. Particularly, considering that a channel access procedure (CAP) is required to transmit a signal in the unlicensed band, the UE may perform a random access procedure with the BS more rapidly in the unlicensed band.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 15 is a diagram illustrating a simplified representation of the time-axis configuration of physical random access channel (PRACH) Format A0/A1/B1 in one slot including 14 symbols;

BEST MODE

Figure 1:
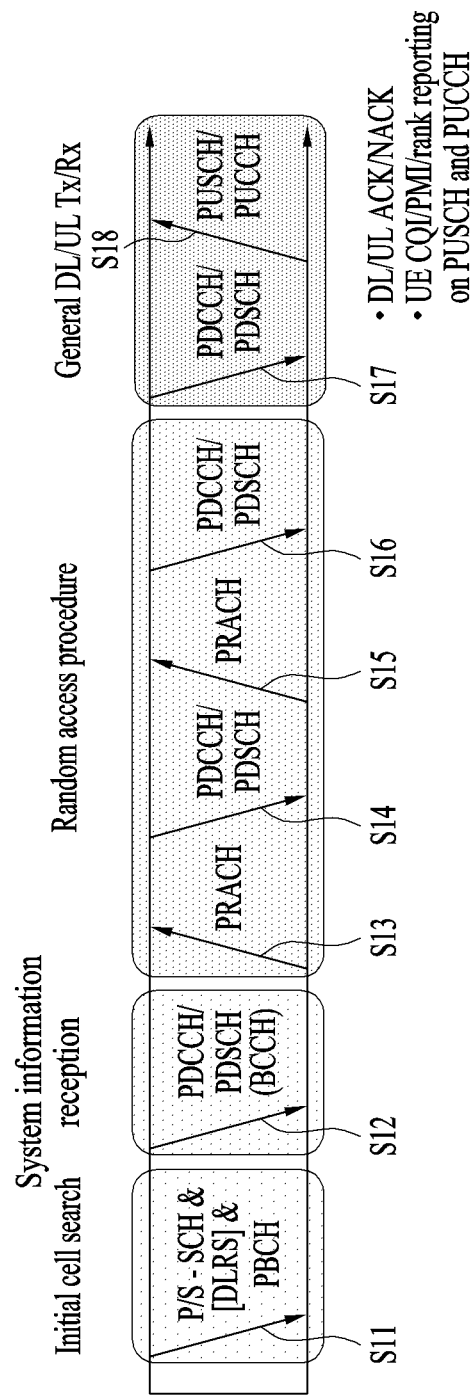
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an institute of electrical and electronics engineers (IEEE) 802.xx system, a 3rd generation partnership project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc.

CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved UTRA (E-UTRA), etc.

UTRA is a part of universal mobile telecommunications system (UMTS). 3GPP LTE is a part of evolved UMTS (E-UMTS) using E-UTRA, adopting OFDMA for DL and SC-FDMA for UL. LTE-advanced (LTE-A) is an evolution of 3GPP LTE.

For clarification of description for technical features of the present disclosure, although the embodiments of the present disclosure will be described based on a 3GPP NR system as well as a 3GPP LTE/LTE-A system, the present disclosure may be applied to an IEEE 802.16e/m system, etc.

1. 3GPP LTE/LTE-A SYSTEM 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell identifier (ID) by receiving a primary synchronization channel (P-SCH) and a secondary synchronization channel (S-SCH) from the eNB.

Then the UE may acquire information broadcast in the cell by receiving a physical broadcast channel (PBCH) from the eNB.

During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH (S12).

To complete connection to the eNB, the UE may perform a random access procedure with the eNB (S13 to S16). In the random access procedure, the UE may transmit a preamble on a physical random access channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a physical uplink shared channel (PUSCH) and/or a physical uplink control channel (PUCCH) to the eNB (S18), in a general UL/DL signal transmission procedure.

Control information that the UE transmits to the eNB is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2 Resource Structure

Figure 2:
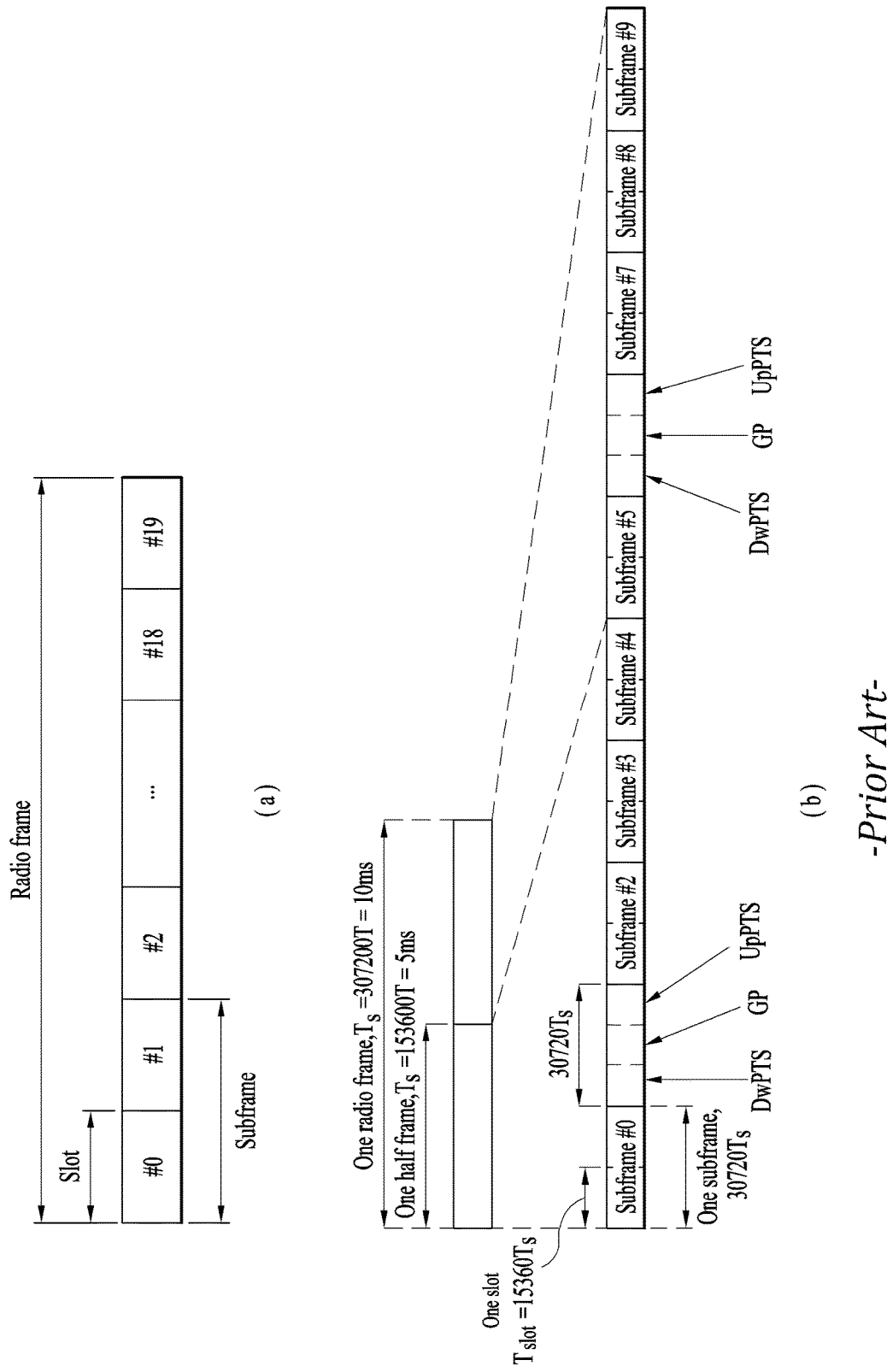
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full frequency division duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An ith subframe includes 2ith and (2i+1)th slots. That is, a radio frame includes 10 subframes. A time required for transmitting one subframe is defined as a transmission time interval (TTI). Here, $T_s$ is a sampling time given as $T_s=1/(15 \text{ kHz} \times 2048)=3.2552 \times 10-8$ (about 33 ns). One slot includes a plurality of orthogonal frequency division multiplexing (OFDM) symbols or SC-FDMA symbols in the time domain by a plurality of resource blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a time division duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An ith subframe includes 2ith and (2i+1)th slots each having a length of 0.5 ms ($T_{slot}=15360 \cdot T_s$). Here, $T_s$ is a sampling time given as $T_s=1/(15 \text{ kHz} \times 2048)=3.2552 \times 10-8$ (about 33 ns).

A type-2 frame includes a special subframe having three fields, downlink pilot time slot (DwPTS), guard period (GP), and uplink pilot time slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called downlink control information (DCI). The DCI transports UL resource assignment information, DL resource assignment information, or UL transmission (Tx) power control commands for a UE group.

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
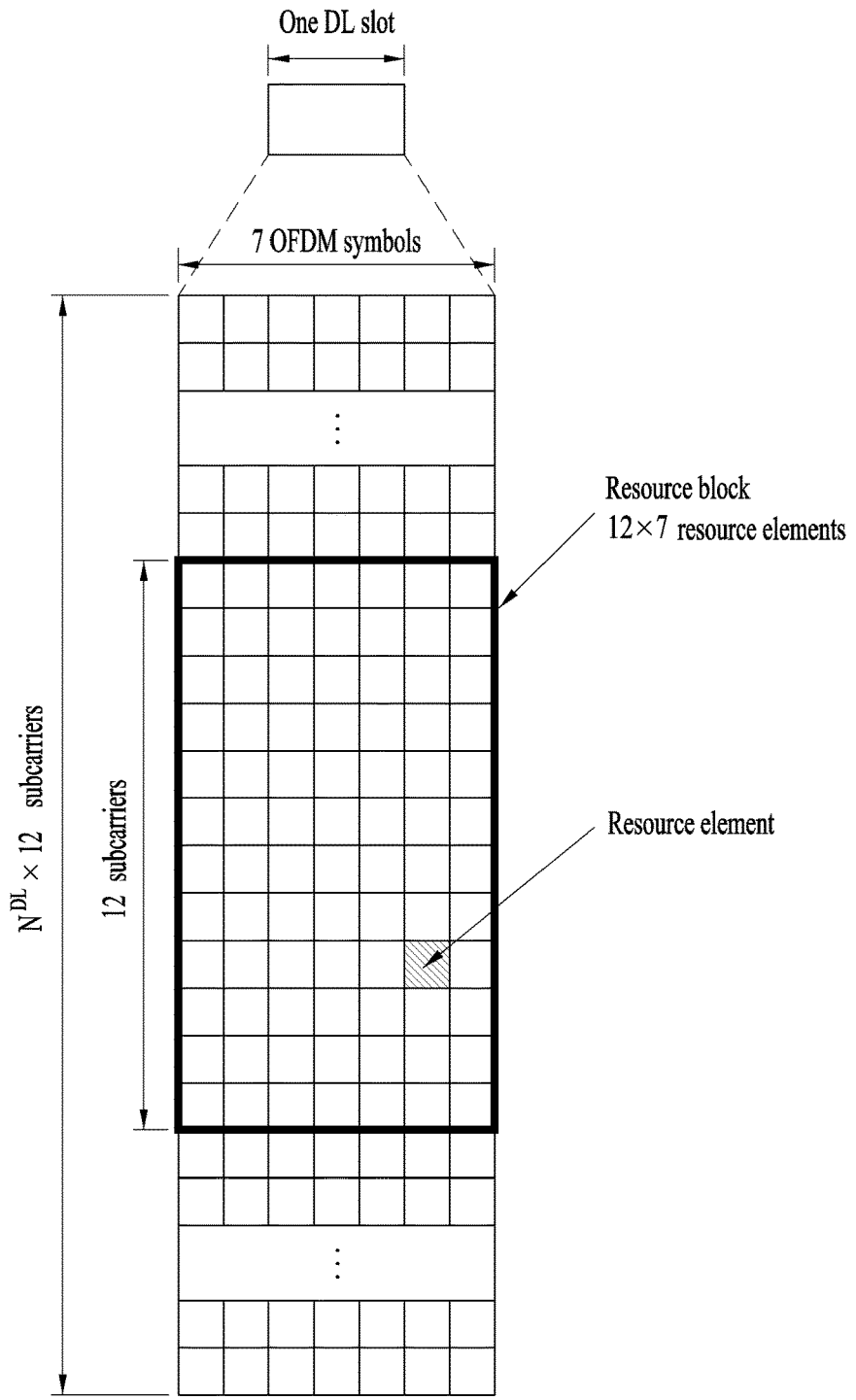
FIG. 3 is a diagram illustrating an exemplary resource grid for the duration of a downlink (DL) slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a resource element (RE). An RB includes 12×7 REs. The number of RBs in a DL slot, NDL depends on a DL transmission bandwidth.

Figure 4:
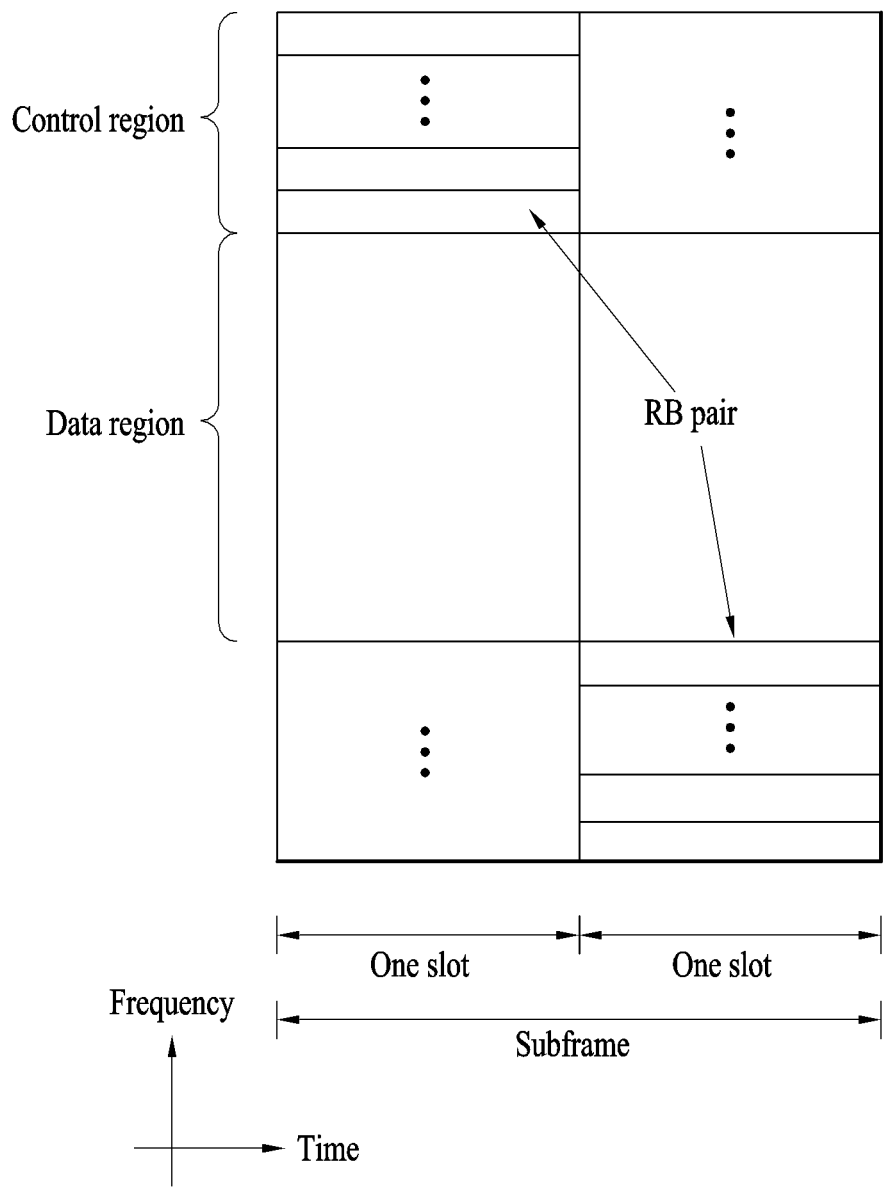
FIG. 4 is a diagram illustrating an exemplary structure of an uplink (UL) subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
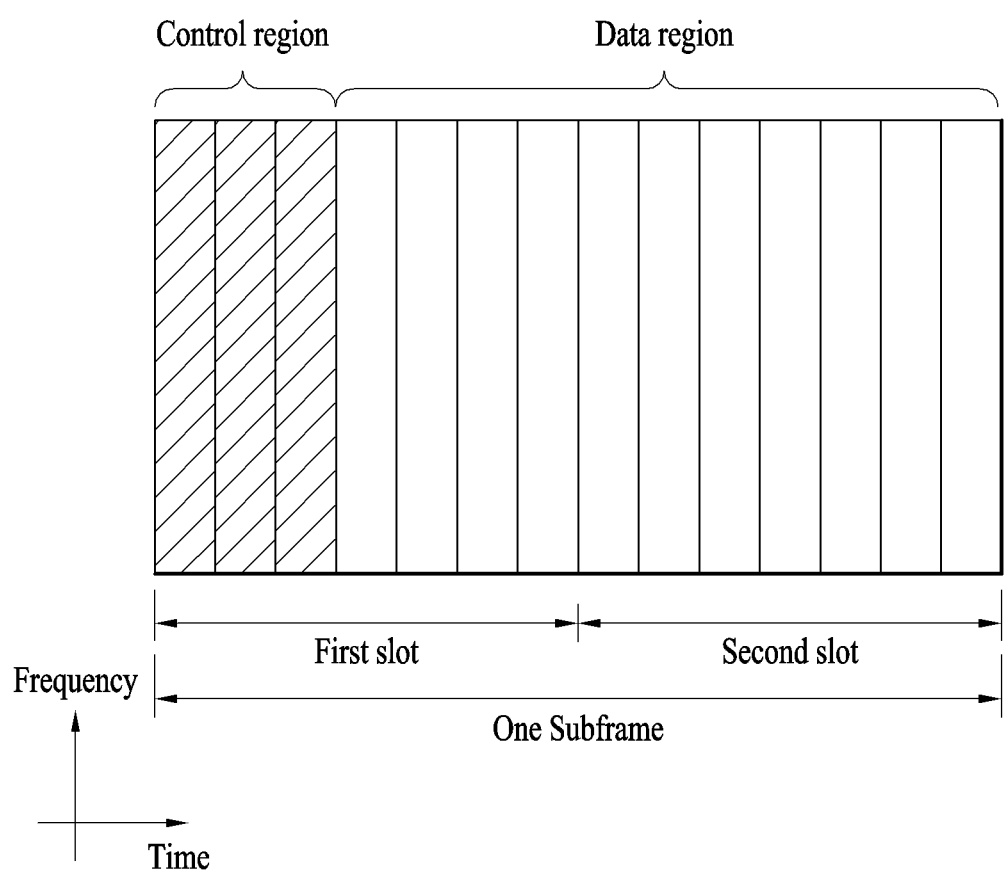
FIG. 5 is a diagram illustrating an exemplary structure of a DL subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a physical control format indicator channel (PCFICH), a PDCCH, and a physical hybrid ARQ indicator channel (PHICH).

2. NEW RADIO ACCESS TECHNOLOGY SYSTEM

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, ultra-reliable and low latency communication (URLLC), and the like, a new RAT system has been proposed. In the present disclosure, the corresponding technology is referred to as the new RAT or new radio (NR) for convenience of description.

2.1. Numerologies

The NR system to which the present disclosure is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 3

| μ | Δf = $2^μ$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,μ}=N_{symb}^{slot}N_{slot}^{subframe,μ}$.

In addition, each subframe may be composed of two half-frames with the same size. In this case, the two half-frames are composed of subframes 0 to 4 and subframes 5 to 9, respectively.

Regarding the subcarrier spacing p, slots may be numbered within one subframe in ascending order like $n_s^μ \in \{0, \ldots, N_{slot}^{subframe,μ}-1\}$ and may also be numbered within a frame in ascending order like $n_{s,f}^μ \in \{0, \ldots, N_{slot}^{frame,μ}-1\}$. In this case, the number of consecutive OFDM symbols in one slot ($N_{symb}^{slot}$) may be determined as shown in the following table according to the cyclic prefix. The start slot ($n_s^μ$) of one subframe is aligned with the start OFDM symbol ($n_s^μ N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,μ}$ | $N_{slot}^{subframe,μ}$ |
|---|---|---|---|
| 2 | 12 | 40 | 4 |

In the NR system to which the present disclosure can be applied, a self-contained slot structure can be applied based on the above-described slot structure.

Figure 6:
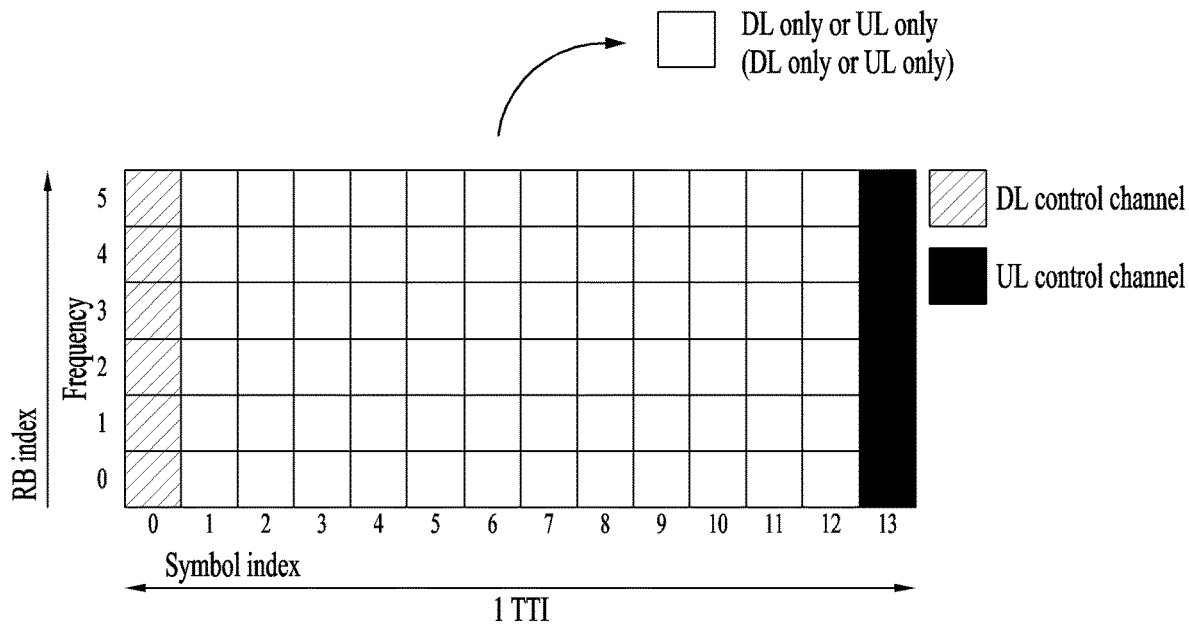
FIG. 6 is a diagram illustrating a self-contained slot structure applicable to the present disclosure.

FIG. 6 is a diagram illustrating a self-contained slot structure applicable to the present disclosure.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present disclosure may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
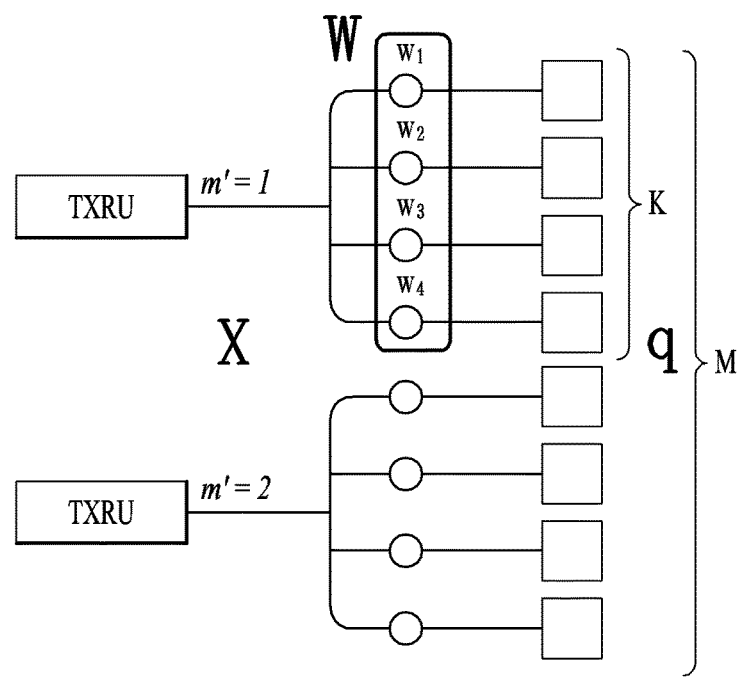
FIGS. 7 and 8 are diagrams illustrating representative connection methods for connecting transceiver units (TXRUs) to antenna elements.
Figure 8:
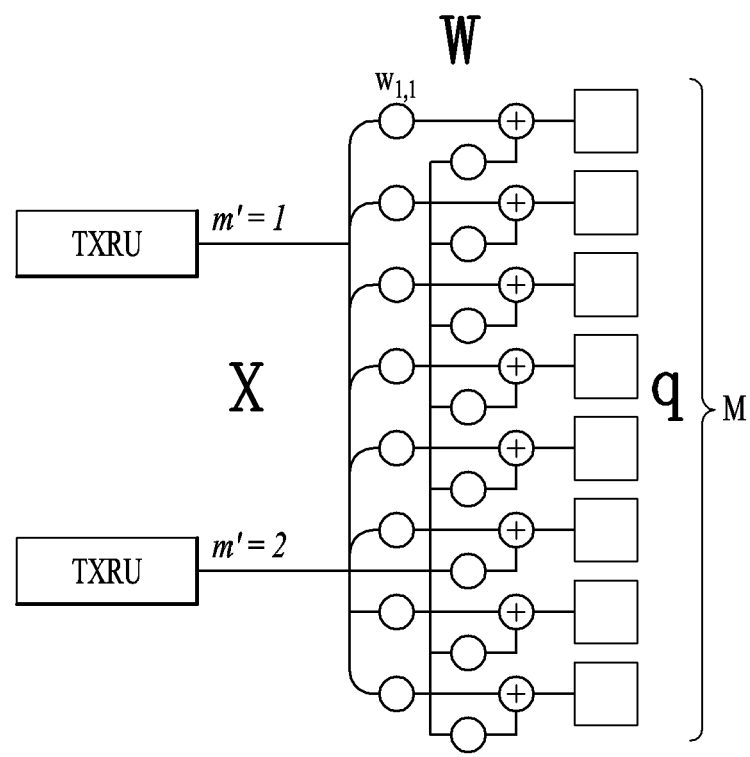

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present disclosure is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N TXRUs and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
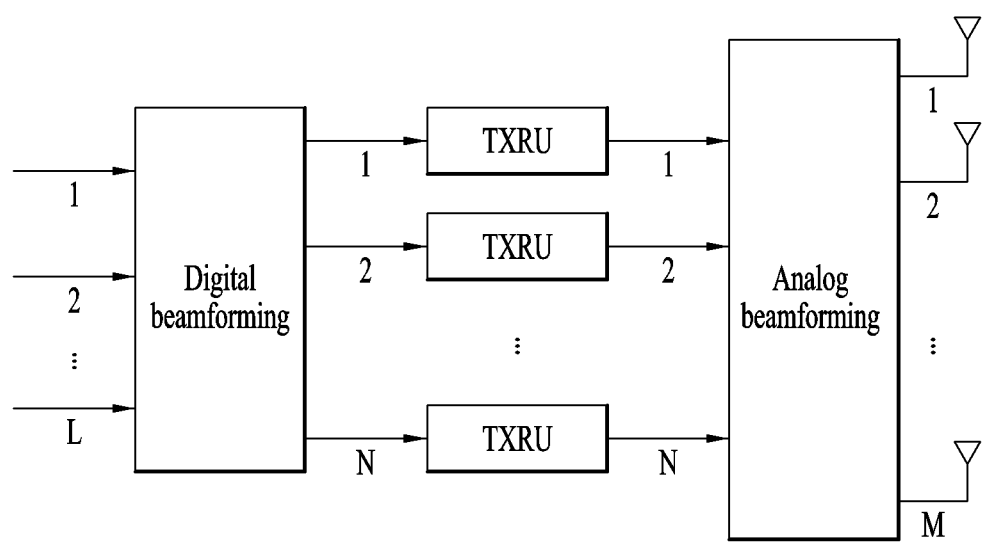
FIG. 9 is a schematic diagram illustrating a hybrid beamforming structure from the perspective of TXRUs and physical antennas according to an embodiment of the present disclosure.

FIG. 9 is a schematic diagram illustrating a hybrid beamforming structure according to an embodiment of the present disclosure from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present disclosure is applicable. Further, a method of introducing a plurality of antenna panels where independent hybrid beamforming can be applied by defining N TXRUs and M RF antennas as one antenna panel has also been considered in the NR system to which the present disclosure is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present disclosure is applicable.

Figure 10:
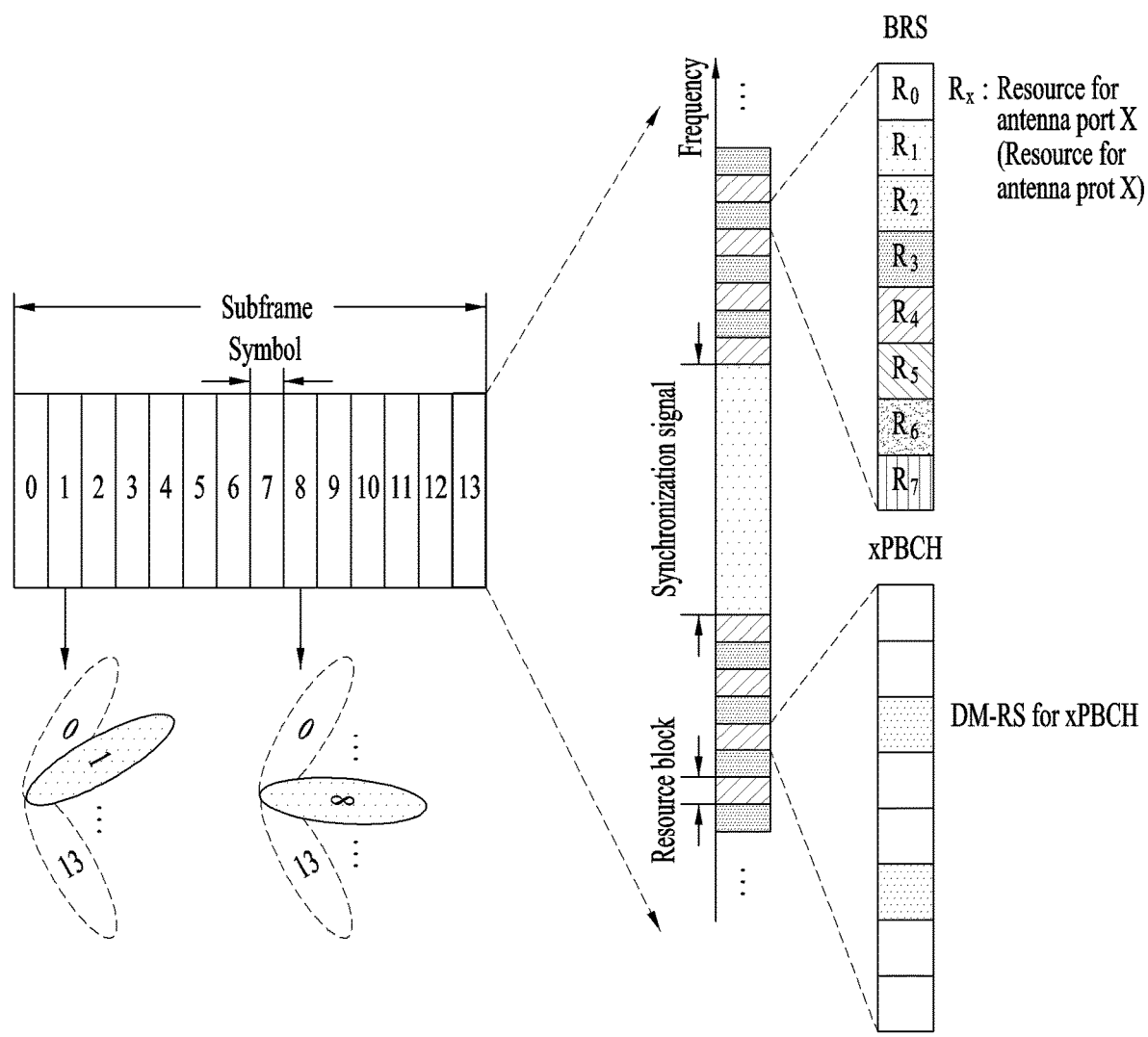
FIG. 10 is a diagram schematically illustrating a beam sweeping operation for synchronization signals and system information during a DL transmission process according to an embodiment of the present disclosure.

FIG. 10 is a diagram schematically illustrating the beam sweeping operation for synchronization signals and system information during a DL transmission process according to an embodiment of the present disclosure In FIG. 10, a physical resource (or channel) for transmitting system information of the NR system to which the present disclosure is applicable in a broadcasting manner is referred to as a physical broadcast channel (xPBCH). In this case, analog beams belonging to different antenna panels can be simultaneously transmitted in one symbol.

In addition, the introduction of a beam reference signal (BRS) corresponding to the RS to which a single analog beam (corresponding to a specific antenna panel) is applied has been discussed as the configuration for measuring a channel per analog beam in the NR system to which the present disclosure is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

3. LICENSED ASSISTED ACCESS (LAA) SYSTEM

Hereinafter, methods for transmitting and receiving data in a carrier aggregation environment of an NR or LTE band, which is a licensed band, and a unlicensed band will be described. In the embodiments of the present disclosure, the LAA system refers to a communication system (e.g., an LTE system or an NR system) that supports a CA situation of the licensed band and the unlicensed band. Here, as the unlicensed band, a WiFi band or a Bluetooth (BT) band may be used.

Here, LAA may refer to an LTE system or an NR system operating in an unlicensed band. LAA may also refer to a method for transmitting and receiving data in the unlicensed band in combination with the licensed band.

Figure 11:
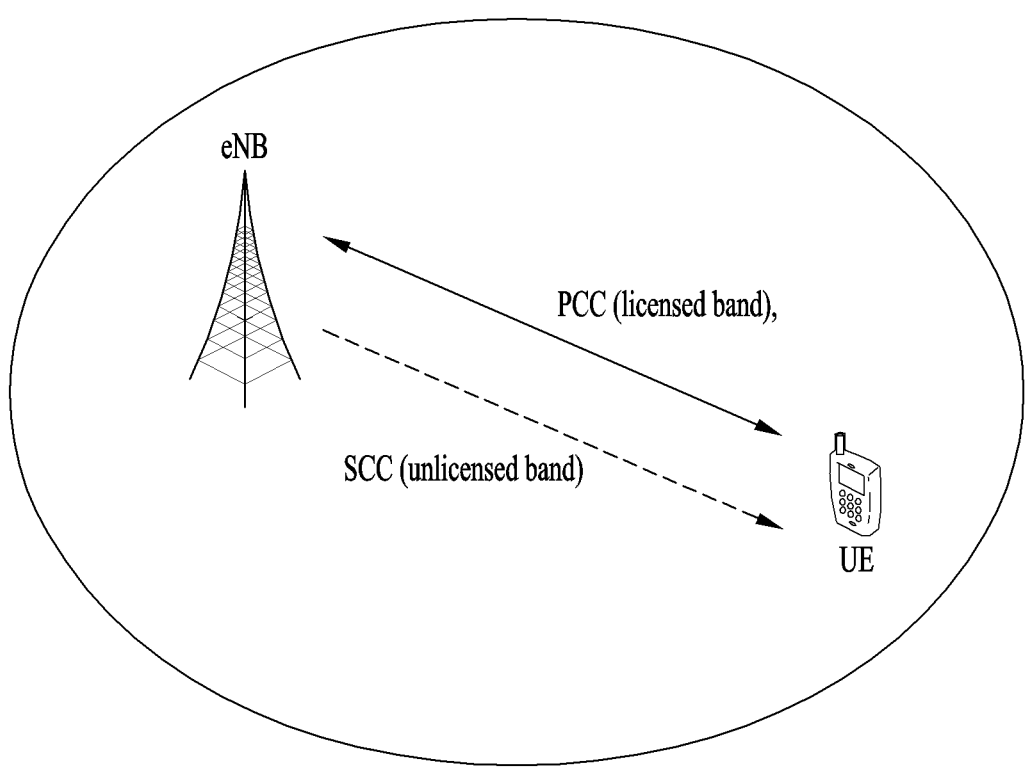
FIG. 11 is a diagram illustrating an example of a carrier aggregation (CA) environment in a wireless communication system supporting an unlicensed band.

FIG. 11 is a diagram illustrating an example of a CA environment in a wireless communication system supporting an unlicensed band.

Hereinafter, for simplicity, it is assumed that the UE is configured to perform wireless communication in each of the licensed band and the unlicensed band using two component carriers (CCs). Of course, the following methods may be applied even when three or more CCs are configured for the UE.

In the embodiments of the present disclosure, it is assumed that a licensed CC (LCC) is a primary CC (which may be called a PCC or a PCell) and an unlicensed CC (UCC) is a secondary CC (which may be called a SCC or SCell). The embodiments of the present disclosure are also be applicable even to a situation in which multiple licensed bands and multiple unlicensed bands are used in a carrier aggregation manner. Further, the proposed schemes of the present disclosure are applicable not only to the 3GPP LTE system and the 3GPP NR system but also to systems having other characteristics.

FIG. 11 illustrates a case where one BS supports both the licensed band and the unlicensed band. That is, the UE may transmit/receive control information and data via a PCC, which is a licensed band, and also transmit/receive control information and data via the SCC, which is an unlicensed band. The situation shown in FIG. 11 is merely one example, and the embodiments of the present disclosure are applicable even to a CA environment where one UE accesses multiple BSs.

For example, the UE may configure a PCell with a macro BS (a macro eNB (M-eNB) or a macro gNB (M-gNB)), and may configure an SCell with a small BS (a small eNB (S-eNB) or a small gNB (S-gNB)). In this case, the macro BS and the small BS may be connected over a backhaul network.

In embodiments of the present disclosure, the unlicensed band may be operated according to a contention-based random access scheme. In this case, channel access procedures for LAA are performed as follows.

3.1. Downlink Channel Access Procedures

An eNB operating LAA SCell(s) (or an unlicensed band) shall perform the DL channel access procedure (CAP) described below for cell(s) in which the LAA SCell(s) transmission(s) are performed.

3.1.1. Channel Access Procedure for Transmission(s) Including PDSCH/PDCCH/EPDCCH The eNB may transmit a transmission including PDSCH/PDCCH/EPDCCH on a carrier on which LAA SCell(s) transmission(s) are performed, after first sensing the channel to be idle during the slot durations of a defer duration Td; and after the counter N is zero in step 4 below. The counter N is adjusted by sensing the channel for additional slot duration(s) according to the steps below:

1) set N=Ninit, where Ninit is a random number uniformly distributed between 0 and CWp, and go to step 4;
2) if N>0 and the eNB chooses to decrement the counter, set N=N−1;
3) sense the channel for an additional slot duration, and if the additional slot duration is idle, go to step 4; else, go to step 5;
4) if N=0, stop; else, go to step 2;
5) sense the channel until a busy slot is detected in an additional defer duration Td or all the slots of the additional defer duration Td are detected to be idle;
6) if the channel is sensed to be idle during all the slot durations of the additional defer duration Td, go to step 4; else, go to step 5.

The CAP for transmission including PDSCH/PDCCH/EPDCCH of the eNB described above may be summarized as follows.

Figure 12:
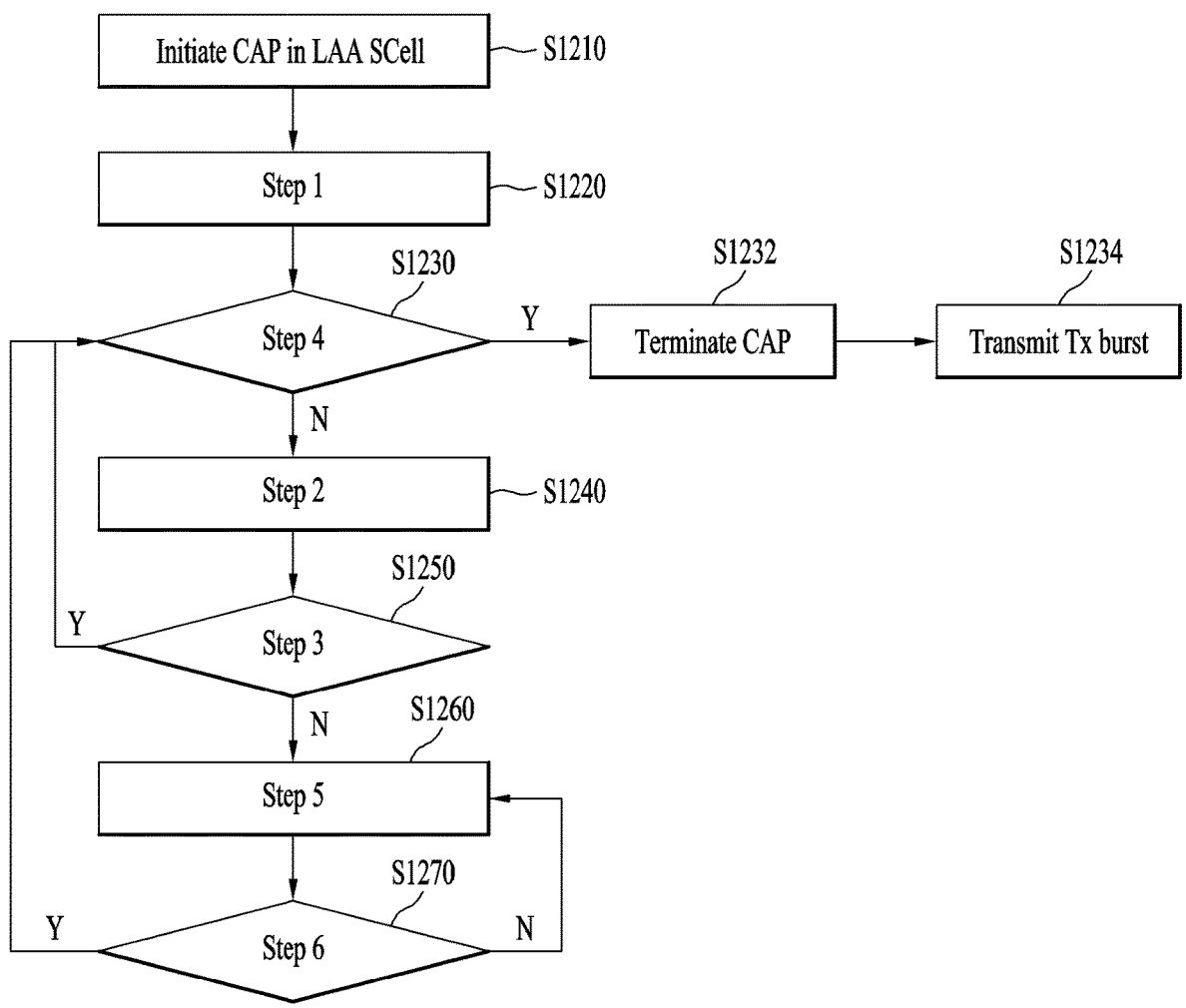
FIG. 12 is a diagram illustrating a channel access procedure (CAP) for unlicensed band transmission applicable to the present disclosure.

FIG. 12 is a diagram illustrating a CAP for unlicensed band transmission applicable to the present disclosure.

For a DL transmission, a transmission node (e.g., an eNB) may initiate a channel access procedure (CAP) to operate in the LAA SCell(s), which are unlicensed band cells (S1210).

The eNB may randomly select a backoff counter N within the contention window CW according to step 1. At this time, N is set to an initial value Ninit (S1220). Ninit is selected as any value from among the values between 0 and CWp.

Next, if the backoff counter value N is 0 in step 4 (S1230; Y), the eNB terminates the CAP (S1232). Then, the eNB may perform Tx burst transmission including PDSCH/PDCCH/EPDCCH (S1234). On the other hand, if the backoff counter value is not 0 (S1230; N), the eNB decrements the backoff counter value by 1 according to step 2 (S1240).

Then, the eNB checks whether the channel of the LAA SCell(s) is idle (S1250). If the channel is idle (S1250; Y), the BS checks whether the backoff counter value is 0 (S1230).

On the contrary, if the channel is not idle in operation S1250 (S1250; N), namely, if the channel is busy, the eNB checks whether the channel is idle during a defer duration Td (25 usec or more) longer than the slot time (e.g., 9 usec) (S1262). If the channel is idle during the defer duration (S1270; Y), the eNB may resume the CAP.

For example, when the backoff counter value Ninit is 10 and it is determined that the channel is busy after the backoff counter value is decreased to 5, the eNB senses the channel during the defer duration to determine whether the channel is idle. If the channel is idle during the defer duration, the eNB may perform the CAP again from the backoff counter value 5 (or 4 after decrementing the backoff counter value by 1) instead of setting the backoff counter value Ninit.

On the other hand, if the channel is busy during the defer duration (S1270; N), the eNB re-performs operation S1260 and checks again whether the channel is idle during a new defer duration.

If an eNB has not transmitted a transmission including PDSCH/PDCCH/EPDCCH on a carrier on which LAA SCell(s) transmission(s) are performed after step 4 in the procedure above, the eNB may transmit a transmission including PDSCH/PDCCH/EPDCCH on the carrier if the following conditions are met:

the channel is sensed to be idle at least in a slot duration Tsl when the eNB is ready to transmit PDSCH/PDCCH/EPDCCH; and the channel has been sensed to be idle during all the slot durations of a defer duration Td immediately before this transmission.

If the channel has not been sensed to be idle in a slot duration Tsl when the eNB senses the channel after it is ready to transmit, or if the channel has been sensed to be not idle during any of the slot durations of a defer duration Td immediately before the intended transmission, the eNB proceeds to step 1 after sensing the channel to be idle during the slot durations of a defer duration Td.

The defer duration Td consists of duration Tf (=16 us) immediately followed by mp consecutive slot durations where each slot duration Tsl is 9 us, and Tf includes an idle slot duration Tsl at the start of Tf.

A slot duration Tsl is considered to be idle if the eNB senses the channel during the slot duration Tsl, and the power detected by the eNB for at least 4 us in the slot duration is less than energy detection threshold XThresh. Otherwise, the slot duration Tsl is considered to be busy.

$CW_{min,p} \leq CW_p \leq CW_{max,p}$ is the contention window. CWp adjustment is described in detail in subclause 3.1.3.

$CW_{min,p}$ and $CW_{max,p}$ chosen before step 1 of the procedure above.

$m_p$, $CW_{min,p}$, and $CW_{max,p}$ are based on channel access priority class associated with the eNB transmission (see Table 6 below).

$X_{Thresh}$ is adjusted as described in subclause 3.1.4.

TABLE 6

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If the eNB transmits discovery signal transmission(s) not including PDSCH/PDCCH/EPDCCH when N>0 in the procedure above, the eNB shall not decrement the counter N during the slot duration(s) overlapping with the discovery signal transmission.

The eNB shall not perform continuous transmission on a carrier on which the LAA SCell(s) transmission(s) are performed, for a period exceeding Tmcot,p as given in Table 6.

For p=3 and p=4 in Table 6, if the absence of any other technology sharing the carrier can be guaranteed on a long term basis (e.g., by level of regulation), Tmcot,p is set to 10 ms. Otherwise, Tmcot,p is set to 8 ms.

3.1.2. Channel Access Procedure for Transmissions Including Discovery Signal Transmission(s) and not Including PDSCH An eNB may transmit a transmission including discovery signal but not including PDSCH on a carrier on which LAA SCell(s) transmission(s) are performed immediately after sensing the channel to be idle for at least a sensing interval Tdrs=25 us and if the duration of the transmission is less than 1 ms. Here, Tdrs consists of a duration Tf(=16 us) immediately followed by one slot duration Tsl=9 us. Tf includes an idle slot duration Tsl at the start of Tf. The channel is considered to be idle for Tdrs, if it is sensed to be idle during the slot durations of Tdrs.

3.1.3. Contention Window Adjustment Procedure

If the eNB transmits transmissions including PDSCH that are associated with channel access priority class p on a carrier, the eNB maintains the contention window value CWp and adjusts CWp before step 1 of the procedure (i.e., before the CAP) described in subclause 3.1.1 for those transmissions using the following steps:

1> for every priority class p∈{1, 2, 3, 4}, set $CW_p=CW_{min,p}$;

2> if at least Z=80% of HARQ-ACK values corresponding to PDSCH transmission(s) in reference subframe k are determined as NACK, increase CWp for every priority class p∈{1, 2, 3, 4} to the next higher allowed value and remain in step 2; otherwise, go to step 1.

In other words, if the probability that the HARQ-ACK values corresponding to the PDSCH transmission(s) in reference subframe k are determined as NACK is at least 80%, the eNB increases the CW values set for each priority class to the next higher priority class. Alternatively, the eNB maintains the CW values set for each priority class as initial values.

Here, reference subframe k is the starting subframe of the most recent transmission on the carrier made by the eNB, for which at least some HARQ-ACK feedback is expected to be available.

The eNB shall adjust the value of CWp for every priority class p∈{1, 2, 3, 4} based on a given reference subframe k only once.

If $CW_p=CW_{max,p}$, the next higher allowed value for adjusting CWp is $CW_{max,p}$.

The probability Z that the HARQ-ACK values corresponding to PDSCH transmission(s) in reference subframe k are determined as NACK may be determined in consideration of the followings:

- if the eNB transmission(s) for which HARQ-ACK feedback is available start in the second slot of subframe k, HARQ-ACK values corresponding to PDSCH transmission(s) in subframe k+1 are also used in addition to the HARQ-ACK values corresponding to PDSCH transmission(s) in subframe k.
- if the HARQ-ACK values correspond to PDSCH transmission(s) on an LAA SCell that are assigned by (E)PDCCH transmitted on the same LAA SCell,
  - if no HARQ-ACK feedback is detected for a PDSCH transmission by the eNB, or if the eNB detects 'DTX', 'NACK/DTX' or 'any' state, it is counted as NACK.
- if the HARQ-ACK values correspond to PDSCH transmission(s) on an LAA SCell that are assigned by (E)PDCCH transmitted on another LAA cell,
  - if the HARQ-ACK feedback for a PDSCH transmission is detected by the eNB, 'NACK/DTX' or 'any' state is counted as NACK, and 'DTX' state is ignored.
  - if no HARQ-ACK feedback is detected for a PDSCH transmission by the eNB,
    - if PUCCH format 1 with channel selection is expected to be used by the UE, 'NACK/DTX' state corresponding to 'no transmission' is counted as NACK, and 'DTX' state corresponding to 'no transmission' is ignored. Otherwise, the HARQ-ACK for the PDSCH transmission is ignored.
- if a PDSCH transmission has two codewords, the HARQ-ACK value of each codeword is considered separately.
- bundled HARQ-ACK across M subframes is considered as M HARQ-ACK responses.

If the eNB transmits transmissions including PDCCH/EPDCCH with DCI format 0A/0B/4A/4B and not including PDSCH that are associated with channel access priority class p on a channel starting from time t0, the eNB maintains the contention window value CWp and adjusts CWp before step 1 of the procedure described in subclause 3.1.1 for those transmissions (i.e., before performing the CAP) using the following steps:

1> for every priority class p∈{1, 2, 3, 4}, set $CW_p=CW_{min,p}$;

2> if less than 10% of the UL transport blocks scheduled by the eNB using Type 2 channel access procedure (described in subclause 3.2.1.2) in the time interval between t0 and t0+TCO have been received successfully, increase CWp for every priority class p∈{1, 2, 3, 4} to the next higher allowed value and remain in step 2; otherwise, go to step 1.

Here, TCO is calculated as described is computed as described in subclause 3.2.1.

If the $CW_p=CW_{max,p}$ is consecutively used K times for generation of Ninit, CWp is reset to CWmin,p only for that priority class p for which $CW_p=CW_{max,p}$ is consecutively used K times for generation of Ninit. K is selected by the eNB from the set of values {1, 2, . . . , 8} for each priority class p∈{1, 2, 3, 4}.

3.1.4. Energy Detection Threshold Adaptation Procedure

An eNB accessing a carrier on which LAA SCell(s) transmission(s) are performed, shall set the energy detection threshold (XThresh) to be less than or equal to the maximum energy detection threshold XThresh_max.

The maximum energy detection threshold XThresh_max is determined as follows:

if the absence of any other technology sharing the carrier can be guaranteed on a long term basis (e.g., by level of regulation), then:

$$X_{Thresh\_max} = \min\left\{ \begin{array}{l} T_{max} + 10 \text{ dB,} \\ X_r \end{array} \right\},$$

where Xr is the energy detection threshold defined by regulatory requirements in dBm when such requirements are defined, otherwise $X_r=T_{max}+10$ dB.

Otherwise, $$X_{Thres\_max} = \max\left\{ \begin{array}{l} -72 + 10 \cdot \log10(BWMHz/20 \text{ MHz}) \text{ dBm,} \\ \min\left\{ \begin{array}{l} T_{max}, \\ T_{max} - T_A + (P_H + 10 \cdot \log10(BWMHz/20 \text{ MHz}) - P_{Tx}) \end{array} \right\} \end{array} \right\},$$

where each variable is defined as follows:

$T_A=10$ dB for transmission(s) including PDSCH;

$T_A=5$ dB for transmissions including discovery signal transmission(s) and not including PDSCH;

$P_H=23$ dBm;

$P_{TX}$ is the set maximum eNB output power in dBm for the carrier;

eNB uses the set maximum transmission power over a single carrier irrespective of whether single carrier or multi-carrier transmission is employed $T_{max}$ (dBm)=10·log 10(3.16228·10$^{-8}$ (mW/MHz)· BWMHz (MHz));

BWMHz is the single carrier bandwidth in MHz.

3.1.5 Channel Access Procedure for Transmission(s) on Multiple Carriers

An eNB can access multiple carriers on which LAA SCell(s) transmission(s) are performed, according to one of the Type A or Type B procedures described below.

3.1.5.1. Type A Multi-Carrier Access Procedures

The eNB shall perform channel access on each carrier $c_i \in C$, according to the procedures described in this subclause, where C is a set of carriers on which the eNB intends to transmit, and i=0, 1, ... q−1, and q is the number of carriers on which the eNB intends to transmit.

The counter N described in subclause 3.1.1 (i.e., the counter N considered in the CAP) is determined for each carrier $c_i$ and is denoted as $N_{c_i}$. $N_{c_i}$ is maintained according to subclause 3.1.5.1.1 or 3.1.5.1.2 below.

3.1.5.1.1. Type A1

Counter N as described in subclause 3.1.1 (i.e., the counter N considered in the CAP) is independently determined for each carrier $c_i$ and is denoted as $N_{c_i}$.

If the absence of any other technology sharing the carrier can be guaranteed on a long term basis (e.g., by level of regulation), when the eNB ceases transmission on any one carrier $c_j \in C$, for each carrier ci (where $c_i \neq c_j$), the eNB can resume decrementing $N_{c_i}$ when idle slots are detected either after waiting for a duration of $4 \cdot T_{sl}$, or after reinitialising $N_{c_i}$.

3.1.5.1.2. Type A2

Counter N is determined as described in subclause 3.1.1 for each carrier $c_j \in C$, and is denoted as $N_{c_j}$, where $c_j$ may be the carrier that has the largest CWp value. For each carrier $c_i$, $N_{c_i}=N_{c_j}$.

When the eNB ceases transmission on any one carrier for which $N_{c_i}$ is determined, the eNB shall reinitialise $N_{c_i}$ for all carriers.

3.1.5.2. Type B Multi-Carrier Access Procedure

A carrier $c_j \in C$ is selected by the eNB as follows:

the eNB selects $c_j$ by uniformly randomly choosing $c_j$ from C before each transmission on multiple carriers $c_i \in C$; or the eNB selects $c_j$ no more frequently than once every 1 second, where C is a set of carriers on which the eNB intends to transmit, i=0, 1, ... q−1, and q is the number of carriers on which the eNB intends to transmit.

To transmit on carrier $c_j$, the eNB shall perform channel access on carrier $c_j$ according to the procedures described in subclause 3.1.1 with the modifications described in 3.1.5.2.1 or 3.1.5.2.2.

To transmit on carrier $c_i \neq c_j$, $c_i \in C$, for each carrier $c_i$, the eNB shall sense the carrier $c_i$ for at least a sensing interval $T_{mc}=25$ us immediately before the transmitting on carrier $c_j$. And the eNB may transmit on carrier $c_i$ immediately after sensing the carrier $c_i$ to be idle for at least the sensing interval $T_{mc}$. The carrier $c_i$ is considered to be idle for $T_{mc}$ if the channel is sensed to be idle during all the time durations in which such idle sensing is performed on the carrier $c_j$ in given interval $T_{mc}$.

The eNB shall not continuously transmit on a carrier $c_i \neq c_j$ (where $c_i \neq C$) for a period exceeding Tmcot,p as given in Table 6, where the value of Tmcot,p is determined using the channel access parameters used for carrier $c_j$.

3.1.5.2.1. Type B1

A single CWp value is maintained for the set of carriers C.

For determining CWp for channel access on carrier $c_j$, step 2 of the procedure described in subclause 3.1.3 is modified as follows:

if at least Z=80% of HARQ-ACK values corresponding to PDSCH transmission(s) in reference subframe k of all carriers $c_i \in C$ are determined as NACK, increase CWp for every priority class p∈{1, 2, 3, 4} to the next higher allowed value; otherwise, go to step 1.

3.1.5.2.2. Type B2

A CWp value is maintained independently for each carrier $c_i \in C$ using the procedure described in subclause 3.1.3. For determining Ninit for carrier $c_j$, CWp value of carrier $c_{j1} \in C$ is used, where $c_{j1}$ is the carrier with the largest CWp among all carriers in set C.

3.2. Uplink Channel Access Procedures

A UE and an eNB scheduling UL transmission(s) for the UE shall perform the procedures described below to access the channel(s) on which the LAA SCell(s) transmission(s) are performed.

3.2.1. Channel Access Procedure for UL Transmission (s)

The UE can access a carrier on which LAA SCell(s) UL transmission(s) are performed according to one of Type 1 or Type 2 UL channel access procedures. Type 1 channel access procedure is described in subclause 3.2.1.1 below. Type 2 channel access procedure is described in subclause 3.2.1.2 below.

If an UL grant scheduling a PUSCH transmission indicates Type 1 channel access procedure, the UE shall use Type 1 channel access procedure for transmitting transmissions including the PUSCH transmission unless stated otherwise in this subclause.

If an UL grant scheduling a PUSCH transmission indicates Type 2 channel access procedure, the UE shall use Type 2 channel access procedure for transmitting transmissions including the PUSCH transmission unless stated otherwise in this subclause.

The UE shall use Type 1 channel access procedure for SRS (Sounding Reference Signal) transmissions not including a PUSCH transmission. UL channel access priority class p=1 is used for SRS transmissions not including a PUSCH.

TABLE 7

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |

TABLE 7-continued

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 µs. The maximum duration before including any such gap shall be 6 ms.

If the 'UL configuration for LAA' field configures an 'UL offset' 1 and an 'UL duration' d for subframe n, then the UE may use channel access Type 2 for transmissions in subframes n+l+i (where i=0, 1, ... d−1), if the end of UE transmission occurs in or before subframe n+l+d−1.

If the UE scheduled to transmit transmissions including PUSCH in a set of subframes $n_0, n_1, \ldots, n_{w-1}$ using PDCCH DCI format 0B/4B, and if the UE cannot access the channel for a transmission in subframe $n_k$, the UE shall attempt to make a transmission in subframe $n_{k+1}$ according to the channel access type indicated in the DCI, where k∈{0, 1, ... w−2}, and w is the number of scheduled subframes indicated in the DCI.

If the UE is scheduled to transmit transmissions without gaps including PUSCH in a set of subframes $n_0, n_1, \ldots, n_{w-1}$, using one or more PDCCH DCI format 0A/0B/4A/4B and the UE performs a transmission in subframe $n_k$ after accessing the carrier according to one of Type 1 or Type 2 channel access procedures, the UE may continue transmission in subframes after $n_k$ where k∈{0, 1, ... w−1}.

If the beginning of UE transmission in subframe n+1 immediately follows the end of UE transmission in subframe n, the UE is not expected to be indicated with different channel access types for the transmissions in those subframes.

If the UE is scheduled to perform transmission without gaps in subframes $n_0, n_1, \ldots, n_{w-1}$, using one or more PDCCH DCI format 0A/0B/4A/4B, and if the UE has stopped transmitting during or before subframe $n_{k1}$, where k1∈{0, 1, ... w−2}, and if the channel is sensed by the UE to be continuously idle after the UE has stopped transmitting, the UE may transmit in a later subframe $n_{k2}$, where k2∈{1, ... w−1}, using Type 2 channel access procedure. If the channel sensed by the UE is not continuously idle after the UE has stopped transmitting, the UE may transmit in a later subframe $n_{k2}$, where k2∈{1, ... w−1}, using Type 1 channel access procedure with the UL channel access priority class indicated in the DCI corresponding to subframe $n_{k2}$.

If the UE receives an UL grant and the DCI indicates a PUSCH transmission starting in subframe n using Type 1 channel access procedure, and if the UE has an ongoing Type 1 channel access procedure before subframe n:
- if the UL channel access priority class value p1 used for the ongoing Type 1 channel access procedure is same or larger than the UL channel access priority class value p2 indicated in the DCI, the UE may transmit the PUSCH transmission in response to the UL grant by accessing the carrier by using the ongoing Type 1 channel access procedure;
- if the UL channel access priority class value p1 used for the ongoing Type 1 channel access procedure is smaller than the UL channel access priority class value p2 indicated in the DCI, the UE shall terminate the ongoing channel access procedure.

If the UE is scheduled to transmit on a set of carriers C in subframe n, and if the UL grants scheduling PUSCH transmissions on the set of carriers C indicate Type 1 channel access procedure, and if the same 'PUSCH starting position' is indicated for all carriers in the set of carriers C, and if the carrier frequencies of the set of carriers C is a subset of one of the sets of predefined carrier frequencies,
- the UE may transmit on carrier $c_i \in C$ using Type 2 channel access procedure.
  - if Type 2 channel access procedure is performed on carrier $c_i$ immediately before the UE transmission on carrier $c_j \in C$, where i≠j, and
  - if the UE has accessed carrier $c_j$ using Type 1 channel access procedure,
    - carrier $c_j$ is selected by the UE uniformly randomly from the set of carriers C before performing Type 1 channel access procedure on any carrier in the set of carriers C.

A BS may indicate Type 2 channel access procedure in the DCI of an UL grant scheduling transmission(s) including PUSCH on a carrier in subframe n when the BS has transmitted on the carrier according to the channel access procedure described in subclause 3.1.1.

Alternatively, a BS may indicate using the 'UL Configuration for LAA' field that the UE may perform a Type 2 channel access procedure for transmissions(s) including PUSCH on a carrier in subframe n when the BS has transmitted on the carrier according to the channel access procedure described in subclause 3.1.1.

Alternatively, a BS may schedule transmissions including PUSCH on a carrier in subframe n, that follows a transmission by the BS on that carrier with a duration of $T_{short\_ul}=25$ us, if subframe n occurs within the time interval starting at t0 and ending at t0+TCO, where $T_{CO}=T_{mcot,p}+T_g$, where each variable may be defined as follows:
- t0 is the time instant when the BS has started transmission;
- Tmcot,p is determined by the BS as described in subclause 3.1;
- Tg is the total duration of all gaps of duration greater than 25 us that occur between the DL transmission of the BS and UL transmissions scheduled by the BS, and between any two UL transmissions scheduled by the BS starting from t0.

The BS shall schedule UL transmissions between t0 and t0+TCO in contiguous subframes if they can be scheduled contiguously.

For an UL transmission on a carrier that follows a transmission by the BS on that carrier within a duration of $T_{short\_ul}=25$ us, the UE may use Type 2 channel access procedure for the UL transmission.

If the BS indicates Type 2 channel access procedure for the UE in the DCI, the BS indicates the channel access priority class used to obtain access to the channel in the DCI.

3.2.1.1. Type 1 UL Channel Access Procedure

The UE may perform the transmission using Type 1 channel access procedure after sensing the channel to be idle during the slot durations of a defer duration Td; and after the counter N is zero in step 4. The counter N is adjusted by sensing the channel for additional slot duration(s) according to the steps described below:

1) set N=Ninit, where Ninit is a random number uniformly distributed between 0 and CWp, and go to step 4;

2) if N>0 and the UE chooses to decrement the counter, set N=N−1;

3) sense the channel for an additional slot duration, and if the additional slot duration is idle, go to step 4; else, go to step 5;

4) if N=0, stop; else, go to step 2;

5) sense the channel until either a busy slot is detected within an additional defer duration Td or all the slots of the additional defer duration Td are detected to be idle;

6) if the channel is sensed to be idle during all the slot durations of the additional defer duration Td, go to step 4; else, go to step 5.

In brief, Type 1 UL CAP of the UE described above may be summarized as follows.

For UL transmissions, a transmission node (e.g., a UE) may initiate a CAP to operate in the LAA SCell(s), which are unlicensed band cells (S1210).

1 The UE may randomly select a backoff counter N within the contention window CW according to step 1. At this time, N is set to an initial value Ninit (S1220). Ninit is selected as any value among the values between 0 and CWp.

Next, if the backoff counter value N is 0 in step 4 (S1230; Y), the UE terminates the CAP (S1232). Then, the eNB may perform a Tx burst transmission (S1234). On the other hand, if the backoff counter value is not 0 (S1230; N), the UE decrements the backoff counter value by 1 according to step 2 (S1240).

Then, the UE checks whether the channel of the LAA SCell(s) is idle (S1250). If the channel is idle (S1250; Y), the BS checks whether the backoff counter value is 0 (S1230).

On the contrary, if the channel is not idle in operation S1250 (S1250; N), namely, if the channel is busy, the UE checks whether the channel is idle during a defer duration Td (25 usec or more) longer than the slot time (e.g., 9 usec) (S1262). If the channel is idle during the defer duration (S1270; Y), the UE may resume the CAP.

For example, when the backoff counter value Ninit is 10 and it is determined that the channel is busy after the backoff counter value is decreased to 5, the UE senses the channel during the defer duration to determine whether the channel is idle. If the channel is idle during the defer duration, the UE may perform the CAP again from the backoff counter value 5 (or from 4 after decrementing the backoff counter value by 1) instead of setting the backoff counter value Ninit.

On the other hand, if the channel is busy during the defer duration (S1270; N), the UE re-performs operation S1260 and checks again whether the channel is idle for a new defer duration.

If the UE has not transmitted a transmission including PUSCH on a carrier on which LAA SCell(s) transmission(s) are performed after step 4 in the procedure above, the UE may transmit a transmission including PUSCH on the carrier if the following conditions are met:
  the channel is sensed to be idle at least in a slot duration Tsl when the UE is ready to transmit the transmission including PUSCH; and
  the channel has been sensed to be idle during all the slot durations of a defer duration Td immediately before the transmission including PUSCH.

On the other hand, if the channel has not been sensed to be idle in a slot duration Tsl when the UE first senses the channel after it is ready to transmit, or if the channel has not been sensed to be idle during any of the slot durations of a defer duration Td immediately before the intended transmission including PUSCH, the UE proceeds to step 1 after sensing the channel to be idle during the slot durations of a defer duration Td.

The defer duration Td consists of duration Tf (=16 us) immediately followed by mp consecutive slot durations where each slot duration Tsl is 9 us, and Tf includes an idle slot duration Tsl at the start of Tf.

A slot duration Tsl is considered to be idle if the UE senses the channel during the slot duration, and the power detected by the UE for at least 4 us within the slot duration is less than energy detection threshold XThresh. Otherwise, the slot duration Tsl is considered to be busy.

$CW_{min,p} \leq CW_p \leq CW_{max,p}$ is the contention window. CWp adjustment is described in detail in subclause 3.2.2.

$CW_{min,p}$ and $CW_{max,p}$ chosen before step 1 of the procedure above.

$m_p$, $CW_{min,p}$, and $CW_{max,p}$ are based on channel access priority class signaled to the UE (see Table 7).

$X_{Thresh}$ is adjusted as described in subclause 3.2.3.

3.2.1.2. Type 2 UL Channel Access Procedure

If the UL uses Type 2 channel access procedure for a transmission including PUSCH, the UE may transmit the transmission including PUSCH immediately after sensing the channel to be idle for at least a sensing interval $T_{short\_ul}$=25 us. Tshort_u consists of a duration $T_f$=16 us immediately followed by one slot duration $T_{sl}$=9 us and Tf includes an idle slot duration Tsl at the start of Tf. The channel is considered to be idle for Tshort_ul if it is sensed to be idle during the slot durations of Tshort_ul.

3.2.2. Contention Window Adjustment Procedure

If the UE transmits transmissions using Type 1 channel access procedure that are associated with channel access priority class p on a carrier, the UE maintains the contention window value CWp and adjusts CWp for those transmissions before step 1 of the procedure described in subclause 3.2.1.1 (i.e., before performing the CAP), using the following procedure:
  if a NDI (New Data Indicator) value for at least one HARQ process associated with HARQ_ID_ref is toggled,
    for every priority class p∈{1, 2, 3, 4}, set $CW_p = CW_{min,p}$;
  otherwise, increase CWp for every priority class p∈{1, 2, 3, 4} to the next higher allowed value.

Here, HARQ_ID_ref is the HARQ process ID of UL-SCH in reference subframe nref. The reference subframe nref is determined as follows:
  If the UE receives a UL grant in subframe ng, subframe nw is the most recent subframe before subframe ng-3 in which the UE has transmitted UL-SCH using Type 1 channel access procedure:
    If the UE transmits transmissions including UL-SCH without gaps starting with subframe n0 and in subframes $n_0, n_1, \ldots, n_w$, reference subframe nref is subframe n0;
    otherwise, reference subframe nref is subframe nw.

The UE may keep the value of CWp unchanged for every priority class p∈{1, 2, 3, 4}, if the UE scheduled to transmit transmissions without gaps including PUSCH in a set of subframes $n_0, n_1, \ldots, n_{w-1}$ using Type 1 channel access procedure, and if the UE is not able to transmit any transmission including PUSCH in the set of subframes.

The UE may keep the value of CWp for every priority class p∈{1, 2, 3, 4} the same as that for the last scheduled transmission including PUSCH using Type 1 channel access procedure, if the reference subframe for the last scheduled transmission is also $n_{ref}$.

If $CW_p = CW_{max,p}$, the next higher allowed value for adjusting CWp is $CW_{max,p}$.

If the $CW_p = CW_{max,p}$ is consecutively used K times for generation of Ninit, CWp is reset to CWmin,p only for that priority class p for which $CW_p = CW_{max,p}$ is consecutively used K times for generation of Ninit. K is selected by the UE from the set of values $\{1, 2, \ldots, 8\}$ for each priority class $p \in \{1, 2, 3, 4\}$.

3.2.3. Energy Detection Threshold Adaptation Procedure

A UE accessing a carrier on which LAA SCell(s) transmission(s) are performed, shall set the energy detection threshold (XThresh) to be less than or equal to the maximum energy detection threshold XThresh_max.

The maximum energy detection threshold XThresh_max is determined as follows:

if the UE is configured with higher layer parameter 'maxEnergyDetectionThreshold-r14', XThresh_max is set equal to the value signaled by the higher layer parameter;

otherwise, the UE shall determine X'Thresh_max according to the procedure described in subclause 3.2.3.1;

if the UE is configured with higher layer parameter 'energyDetectionThresholdOffset-r14', XThresh_max is set by adjusting X'Thresh_max according to the offset value signaled by the higher layer parameter;

otherwise, the UE shall set to $X_{Thresh\_max} = X'_{Thresh\_max}$.

3.2.3.1. Default Maximum Energy Detection Threshold Computation Procedure

If the higher layer parameter 'absenceOfAnyOtherTechnology-r14' indicates TRUE:

$$X'_{Thresh\_max} = \min\left\{ \begin{array}{l} T_{max} + 10 \text{ dB}, \\ X_r \end{array} \right\},$$

where Xr is the maximum energy detection threshold defined by regulatory requirements in dBm when such requirements are defined, otherwise $X_r = T_{max} + 10$ dB;

otherwise, $$X'_{Thres\_max} = \max\left\{ \begin{array}{l} -72 + 10 \cdot \log 10(BWMHz/20 \text{ MHz}) \text{ dBm}, \\ \min\left\{ \begin{array}{l} T_{max}, \\ T_{max} - T_A + (P_H + 10 \cdot \log 10(BWMHz/20 \text{ MHz}) - P_{Tx}) \end{array} \right\} \end{array} \right\},$$

where each variable is defined as follows:

$T_A = 10$ dB $P_H = 23$ dBm;

$P_{TX}$ is the set to the value of $P_{CMAX\_H,c}$ as defined in 3GPP TS 36.101.

$T(dBm) = 10 \cdot \log 10(3.16228 \cdot 10^{-5} \text{ (mW/MHz)} \cdot BWMHz \text{ (MHz)})$ BWMHz is the single carrier bandwidth in MHz.

3.3. Subframe Structure Applicable to LAA System

Figure 13:
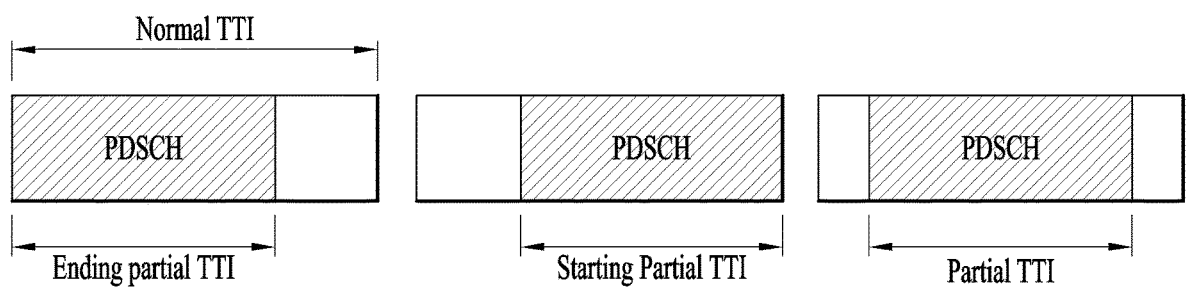
FIG. 13 is a diagram illustrating a partial transmission time interval (TTI) or a partial subframe applicable to the present disclosure.

FIG. 13 is a diagram illustrating a partial TTI or a partial subframe applicable to the present disclosure.

In the Release-13 LAA system, a partial TTI defined as DwPTS to make the most use of MCOT and support continuous transmission in transmitting a DL transmission burst is defined. The partial TTI (or partial subframe) refers to an interval in which a signal is transmitted only by a length less than the conventional TTI (e.g., 1 ms) in transmitting PDSCH.

In the present disclosure, for simplicity, a starting partial TTI or a starting partial subframe refers to a subframe in which some symbols in the head part are left blank, and an ending partial TTI or an ending partial subframe refers to a subframe in which some symbols in the tail part are left blank (whereas a complete TTI is called a normal TTI or a full TTI).

FIG. 13 is a diagram illustrating various forms of the partial TTI described above. In FIG. 13, the first block represents an ending partial TTI (or subframe), and the second block represents a starting partial TTI (or subframe). The third block of FIG. 13 represents a partial TTI (or subframe) having some symbols in the head and tail parts of a subframe left blank. Here, a time interval having no signal transmission in a normal TTI is called a transmission gap (TX gap).

While FIG. 13 is based on the DL operation, the illustrated structure also applicable to the UL operation in the same manner. For example, the partial TTI structure shown in FIG. 13 is applicable to PUCCH and/or PUSCH transmission.

4. PROPOSED EMBODIMENTS

A detailed description will be given of proposed configurations of the present disclosure based on the above technical idea.

To receive UL data without loss from multiple UEs, a BS needs to align the reception timings of the UL data from the UEs with each other as much as possible. Accordingly, the BS needs to preconfigure the starting transmission time of each UE before scheduling UL data for the UE.

However, a UE attempting initial access, an RRC connected-state UE which has not transmitted UL data for long, a high-mobility UE, or the like may not have accurate knowledge of its starting transmission time (or a UL signal/channel transmission timing with respect to a DL signal/channel reception timing). Therefore, the UE may have difficulty in transmitting a signal in synchronization with the BS.

In this context, a detailed description will be given of a specific UL data transmission method of a UE in a situation in which the UE has not acquired UL synchronization with a BS in an NR system applicable to the present disclosure.

The UL data transmission method of the present disclosure may be applied in the same manner to an unlicensed band as well as a licensed band. In this case, the UE may perform a CAP separately to transmit UL data.

Further, a random access method of a UE to which the proposed UL data transmission method is applied will be described below in detail.

4.1. UL Data Transmission Method Proposed in the Present Disclosure

In a situation in which UL timings are not synchronized between a BS and a UE, the UE may transmit UL data by repeatedly transmitting a UL signal of a predetermined symbol duration (e.g., a 1-symbol duration) without a cyclic prefix (CP). UL data and a demodulation reference signal (DM-RS) may be multiplexed in frequency division multiplexing (FDM) within the predetermined symbol duration (e.g., the 1-symbol duration).

In a more specific example, when the UL signal includes K REs, the UE may transmit the DM-RS every N REs. That is, the DM-RS may be transmitted in K/N REs.

When discrete Fourier transform-spread-orthogonal frequency division multiplexing (DFT-s-OFDM) is applied to the UL signal, the UE may map the DM-RS and the UL data in consideration of a peak-to-average power ratio (PAPR). For example, the UE may map the DM-RS every N REs at the front end of DFT and then perform DFT, or may perform DFT once for (K-K/N) REs carrying the UL data.

A repetition number for the UL signal of the predetermined symbol duration (e.g., the 1-symbol duration) may be preconfigured (e.g., determined by a function of the number of symbols in a slot and/or a subcarrier spacing) or configured by RRC signaling (e.g., system information block 1 (SIB1).

Alternatively, a CP transmission of a shorter duration than the predetermined symbol duration before the UL signal of the predetermined symbol duration (e.g., the 1-symbol duration) may be configured.

Figure 14:
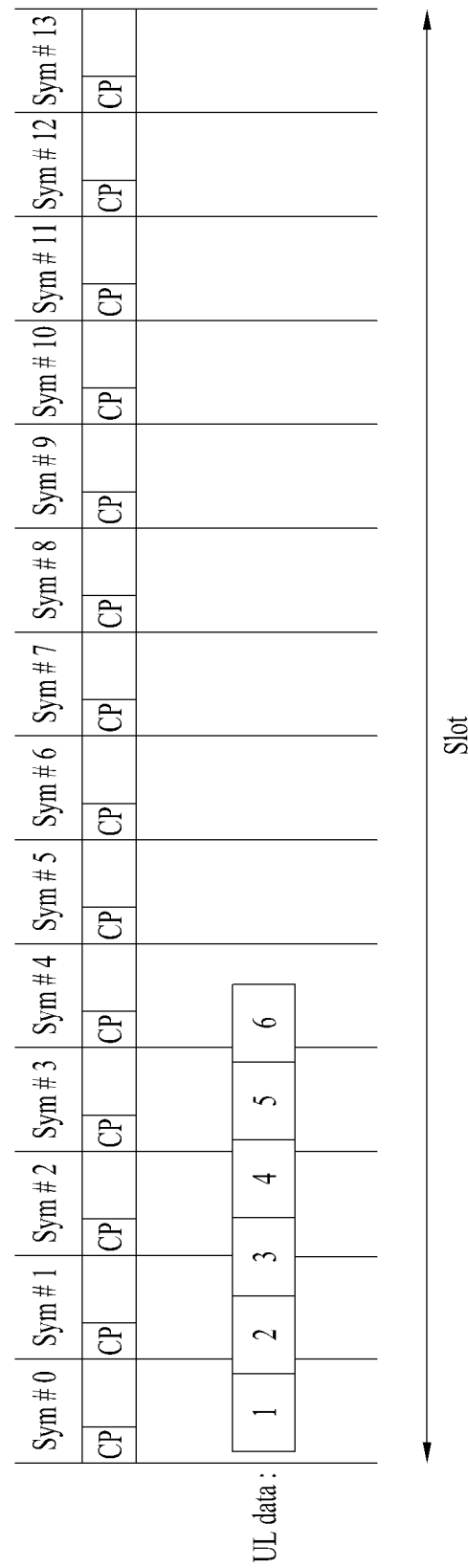
FIG. 14 is a simplified diagram illustrating a method of transmitting UL data according to an example of the present disclosure.

FIG. 14 is a simplified diagram illustrating a method of transmitting UL data according to an example of the present disclosure.

As illustrated in FIG. 14, a UE which has not acquired UL synchronization with a BS may transmit a UL signal of a 1-symbol duration without a CP six times repeatedly in one slot including 14 symbols.

In spite of no knowledge of the starting transmission time of the UL signal from the UE or an expected reception time of the UL signal, the BS may receive the UL signal through fast Fourier transform (FFT) on the assumption of an existing symbol boundary for Sym #1/2/3. A preceding repeated signal serves as a CP so that the BS may decode the UL signal of the UE. Further, the BS may simultaneously receive a UL signal which is transmitted from another UE (UL synchronous or UL asynchronous) in FDM with the UL signal of the UE.

The above-described UL data transmission method may also be applied to a random access procedure.

A random access method of a UE based on the foregoing UL data transmission method, proposed in the present disclosure will be described below in detail.

4.2. Random Access Method Proposed in the Present Disclosure

A random access procedure in an LTE or NR system applicable to the present disclosure may be performed in the following manner.

Step 0

A BS indicates to a specific UE to transmit a PRACH (random access preamble) with a specific sequence at a specific timing in a specific carrier by a PDCCH order (or PDCCH) (however, step 0 may be skipped in the case of contention-based random access).

Step 1

The UE transmits the PRACH (also referred to as Msg1).

Step 2

Upon receipt of the PRACH (or Msg1), the BS transmits a random access response (or Msg2) to the UE within a predetermined time period. The RAR may include UL transmission timing control information, UL power control information, and scheduling information for a PUSCH that the UE will transmit in response to the RAR, for the UE.

Step 3

Upon receipt of the RAR, the UE transmits a PUSCH (or Msg3) at a specific time associated with an RAR reception time according to the scheduling information included in the RAR.

Step 4

Upon receipt of Msg3, the BS transmits a PDSCH (or Msg4) including contention resolution information such as a UE ID to the UE.

The above-described Step 1 to Step 4 may correspond to steps S13 to S16 of FIG. 1, respectively.

To acquire UL synchronization with the BS (or to attempt UL data transmission after the acquisition of UL synchronization) as such, the UE should first perform at least 4-way handshaking.

However, when the UE should transmit delay-sensitive UL data or it is necessary to confirm that a channel is not busy by a listen-before-talk (LBT) operation (or CAP) before a transmission of a specific transmission node as in an unlicensed band, there may be a need for reducing the number of the steps of the foregoing 4-step random access procedure to achieve efficient signal transmission and reception.

In an embodiment of the present disclosure, unlike the foregoing 4-step random access procedure, the UE may perform a 2-step random access procedure which the UE may complete simply by simultaneous transmission of Msg1 and Msg3 and reception of a response for the transmission.

For this purpose, the UE of the present disclosure may multiplex Msg1 and Msg3 for random access (e.g., in FDM or TDM), for transmission in the following proposed methods. The UE may transmit Msg3 for random access in the foregoing UL data transmission method.

First, a PRACH preamble supported by the NR system to which the present disclosure is applicable will be described in detail.

In the present disclosure, two formats are largely available for a PRACH preamble. One of the two formats is a length-839 long sequence (Format 0/1/2/3), and the other format is a length-[127 or 139] short sequence (Format A0/A1/A2/A3/B/B2/B3/B4/C0/C1/C2).

The long sequence (e.g., a length-839 PRACH preamble sequence) may be used to support LTE coverage and a high rate. The long sequence may also be used only at or below 6 GHz according to some embodiments of the present disclosure.

The short sequence (e.g., a length-127 or length-139 PRACH preamble sequence) may be used to support a multiple beam scenario and a TDD frame structure. The short sequence may also be used at or above 6 GHz as well as at or below 6 GHz.

TABLE 8

| Format | $L_{RA}$ | $\Delta f^{RA}$ | $N_u$ | $N_{CP}^{RA}$ |
|---|---|---|---|---|
| 0 | 839 | 1.25 kHz | 24576κ | 3168κ |
| 1 | 839 | 1.25 kHz | 2 · 24576κ | 21024κ |
| 2 | 839 | 1.25 kHz | 4 · 24576κ | 4688κ |
| 3 | 839 | 5 kHz | 24576κ | 3168κ |

Table 8 lists PRACH formats for the length-839 sequence. In Table 8, $L_{RA}$ represents the length of a PRACH sequence, $\Delta f^{RA}$ represents the subcarrier spacing (SCS) of the PRACH sequence, $N_u$ represents the time-axis duration of the PRACH sequence, and $N_{CP}^{RA}$ represents a CP length. Further, κ has a value of 64.

kHz and 5 kHz may be applied as the SCS of the length-839 sequence. Referring to the following table, PRACH format 2 may have a time duration of about 3.35 msec and PRACH format 0/3 may have a time duration of about 0.9 msec.

TABLE 9

| Format | $L_{RA}$ | $\Delta f^{RA}$ | $N_u$ | $N_{CP}^{RA}$ |
|---|---|---|---|---|
| A0 | [127 or 139] | $15 \cdot 2^\mu$ kHz | $2048\kappa \cdot 2^{-\mu}$ | $144\kappa \cdot 2^{-\mu}$ |
| A1 | [127 or 139] | $15 \cdot 2^\mu$ kHz | $2 \cdot 2048\kappa \cdot 2^{-\mu}$ | $288\kappa \cdot 2^{-\mu}$ |
| A2 | [127 or 139] | $15 \cdot 2^\mu$ kHz | $4 \cdot 2048\kappa \cdot 2^{-\mu}$ | $576\kappa \cdot 2^{-\mu}$ |
| A3 | [127 or 139] | $15 \cdot 2^\mu$ kHz | $6 \cdot 2048\kappa \cdot 2^{-\mu}$ | $864\kappa \cdot 2^{-\mu}$ |
| B1 | [127 or 139] | $15 \cdot 2^\mu$ kHz | $2 \cdot 2048\kappa \cdot 2^{-\mu}$ | $216\kappa \cdot 2^{-\mu}$ |
| B2 | [127 or 139] | $15 \cdot 2^\mu$ kHz | $4 \cdot 2048\kappa \cdot 2^{-\mu}$ | $360\kappa \cdot 2^{-\mu}$ |
| B3 | [127 or 139] | $15 \cdot 2^\mu$ kHz | $6 \cdot 2048\kappa \cdot 2^{-\mu}$ | $504\kappa \cdot 2^{-\mu}$ |
| B4 | [127 or 139] | $15 \cdot 2^\mu$ kHz | $12 \cdot 2048\kappa \cdot 2^{-\mu}$ | $936\kappa \cdot 2^{-\mu}$ |
| C0 | [127 or 139] | $15 \cdot 2^\mu$ kHz | $2048\kappa \cdot 2^{-\mu}$ | $1240\kappa \cdot 2^{-\mu}$ |
| C1 | [127 or 139] | $15 \cdot 2^\mu$ kHz | $2 \cdot 2048\kappa \cdot 2^{-\mu}$ | $1384\kappa \cdot 2^{-\mu}$ |
| C2 | [127 or 139] | $15 \cdot 2^\mu$ kHz | $4 \cdot 2048\kappa \cdot 2^{-\mu}$ | $2048\kappa \cdot 2^{-\mu}$ |

Table 9 lists PRACH formats for the length-[127 or 139] sequence. In Table 9, μ is a parameter representing a numerology of Table 3. The SCS of the length-[127 or 139] sequence may be 15/30/60/120 kHz.

The format A series are PRACH sequences designed to be aligned with a symbol boundary without a guard period (GP), and the format B/C series are PRACH sequences for which a GP may exist.

In format A0/C0, a PRACH sequence may be transmitted only in one symbol with no GP configured.

In format A1/B1/C1, a PRACH sequence may be transmitted repeatedly without a CP in two symbols.

In format A2/B2/C2, a PRACH sequence may be transmitted repeatedly without a CP in four symbols.

A PRACH sequence may be transmitted repeatedly 6 times in format A3/B3 and 12 times in format B4.

According to another embodiment of the present disclosure, PRACH formats A0 and C1 may be excluded from the PRACH sequences listed in Table 9, and PRACH format A1/A2/A3/B1/B2/B3/B4/C0/C2 may all be defined to be of length 139.

Figure 15:
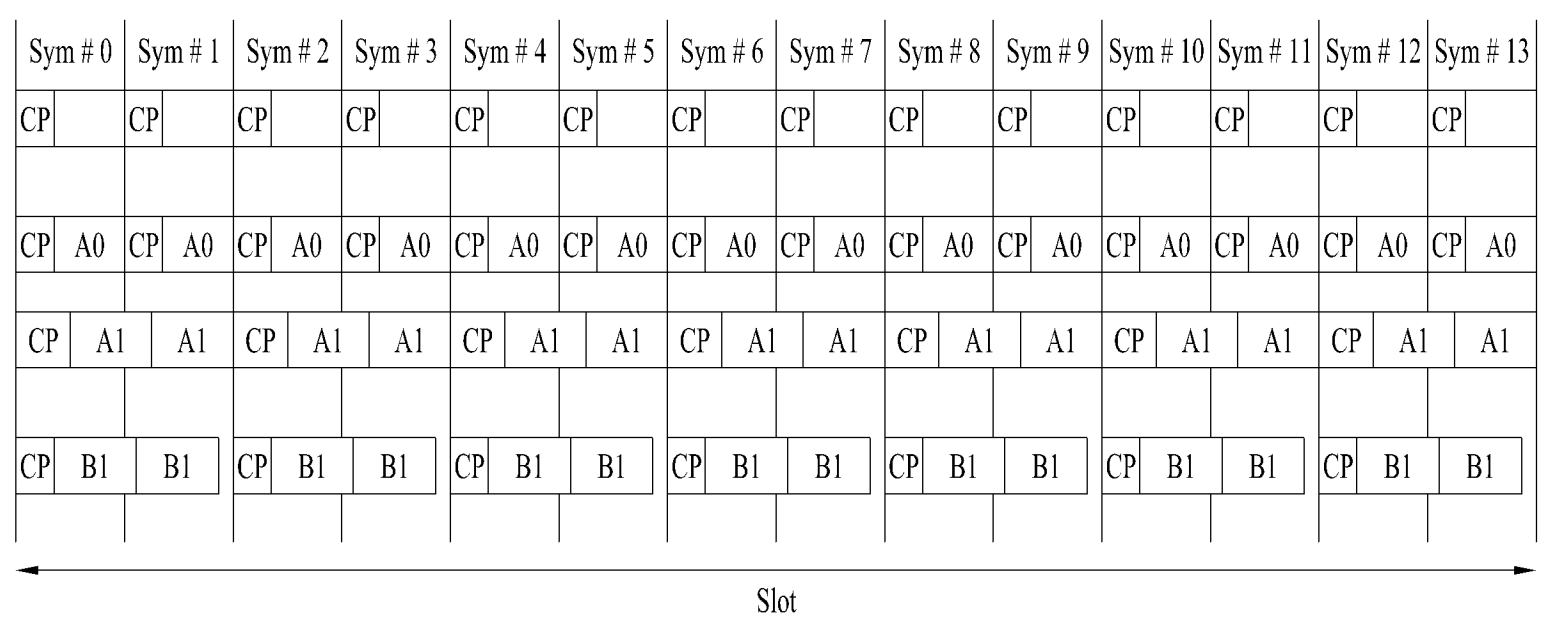

FIG. 15 is a diagram illustrating a simplified representation of the time-axis configuration of PRACH Format A0/A1/B1 in one slot including 14 symbols.

As illustrated in FIG. 15, PRACH format A0 may be transmitted repeatedly every symbol, with a CP included in the symbol.

PRACH format A1 may be transmitted repeatedly every two symbols, with a CP included in the two symbols.

Although PRACH format B1 is similar to PRACH format A1 in that it is transmitted repeatedly every two symbols, with a CP included in the two symbols, the former is different from the latter in that a time duration for which a repeated transmission occurs in two symbols is smaller in the former than in the latter.

Now, a detailed description will be given of various random access methods based on the above-described PRACH preamble according to the present disclosure.

4.2.1. First Random Access Method

In this subclause, a random access method in which a UE transmits a PRACH preamble and Msg3 in FDM will be described in detail. The UE may transmit Msg3 repeatedly in each symbol (e.g., symbol repetition) in the UL data transmission method described in subclause 4.1.

In consideration of the implementation complexity of the UE, this operation may be applied only when the same SCS is set for Msg3 and the PRACH preamble. Further, the same time-axis configuration (e.g., CP length, repetition number, and so on) may be applied to the PRACH and Msg3 in consideration of the implementation complexity of the UE.

Figure 16:
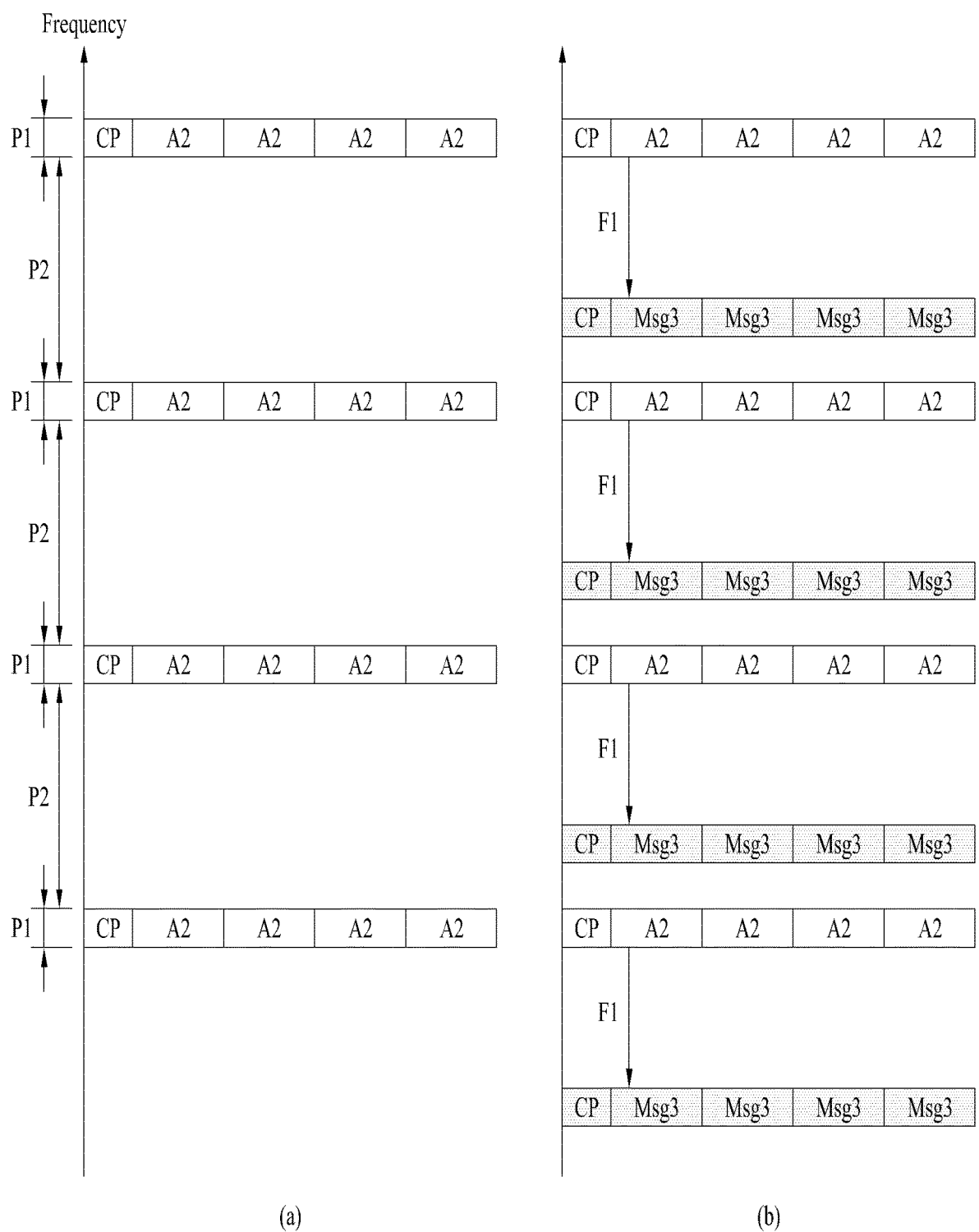
FIGS. 16 to 20 are simplified diagrams illustrating operations of transmitting PRACH format A2 and message 3 (Msg3) by a user equipment (UE) according to the present disclosure.

FIG. 16 is a simplified diagram illustrating an operation of transmitting PRACH format A2 and Msg3 by a UE according to an example of the present disclosure.

As illustrated in FIG. 16, a UE configured with a PRACH transmission in format A2 may simultaneously transmit a PRACH preamble and Msg3 in different frequency resources.

Msg3 transmitted in FDM with the PRACH preamble may or may not include a DM-RS. Whether the DM-RS is transmitted in Msg3 may be configured by a broadcast channel such as a system information block (SIB) or determined based on F1 (e.g., the DM-RS is transmitted when F1 is equal to or larger than a predetermined value or falls within a predetermined value range).

In consideration of a limit on a maximum transmission power per specific bandwidth as is the case with an unlicensed band, a method of transmitting a PRACH preamble (and a UL signal/channel) by extending it along the frequency axis may be defined for power boosting of the PRACH preamble (and the UL signal/channel) in the NR system applicable to the present disclosure.

For example, a length-139 sequence may span about 12 RBs. In this case, the UE may transmit the sequence repeatedly along the frequency axis (i.e., P1=12 RBs). Alternatively, the UE may segment the sequence into sub-blocks along the frequency axis and transmit the sub-blocks distributedly along the frequency axis (e.g., P1=1 RB and the RB is segmented into 12 sub-blocks and distributed uniformly at an interval of P2).

While the following description is given in the context of extension of a PRACH preamble along the frequency axis, a configuration of the present disclosure is also applicable in the same manner to a case in which one sequence continuous along the frequency axis is transmitted without extension along the frequency axis (or one sequence continuous along the frequency axis is transmitted repeatedly along the frequency axis).

A PRACH preamble transmitted as illustrated in the left drawing of FIG. 16 (FIG. 16(a)) may be transmitted in FDM with Msg3 as illustrated in the right drawing of FIG. 16 (FIG. 16(b)). The UE may apply the same time-axis configuration to the simultaneously transmitted PRACH preamble and Msg3, with a frequency offset of F1.

The value of F1 may be predefined or UE-specifically signaled.

When a plurality of UEs transmit PRACH preambles in P1 resources (configured for the PRACH preambles), use of the same F1 value for the UEs may lead to Msg3 collision even though each UE selects and transmits a different PRACH sequence (or each UE is configured with a different PRACH sequence).

Therefore, it may be preferable to configure a different F1 value for each UE. Although this configuration may be helpful for Msg3 reception (e.g., facilitate Msg3 reception) at the BS, the F1 value may be calculated in a predetermined rule, considering that it is difficult to configure an F1 value for each UE during initial access or RRC reconfiguration.

For example, the F1 value may be determined based on a function of {the starting and/or ending RB index of P1, P2, a UE ID, a cell ID, a preamble sequence number (i.e., a preamble index or random access preamble index (RAPID)), a preamble retransmission number, a power ramping counter, a contention window size (CWS), or a selected backoff counter value for the PRACH}.

In a more specific example, the F1 value may be determined by modulo (a preamble sequence number (i.e., a preamble index or an RAPID), P2) or modulo (a preamble sequence number (i.e., a preamble index or an RAPID)+a power ramping counter, P2). Alternatively, the F1 value may be predefined or configured by cell-specific (UE-specific) RRC signaling or L1 signaling.

As described before, Msg3 collision may be avoided by selecting a different F1 value for each UE.

Further, the UE may achieve a frequency diversity gain, further decreasing an Msg3 collision probability by frequency-hopping Msg3 (or as the BS instructs the UE to perform frequency hopping on Msg3).

Characteristically, it may be determined whether the frequency hopping is performed according to a retransmission number of an RACH preamble. For example, only when the retransmission number of the RACH preamble is equal to or less than a specific value (predefined or indicated by RRC signaling), the frequency hopping may be performed.

Figure 17:
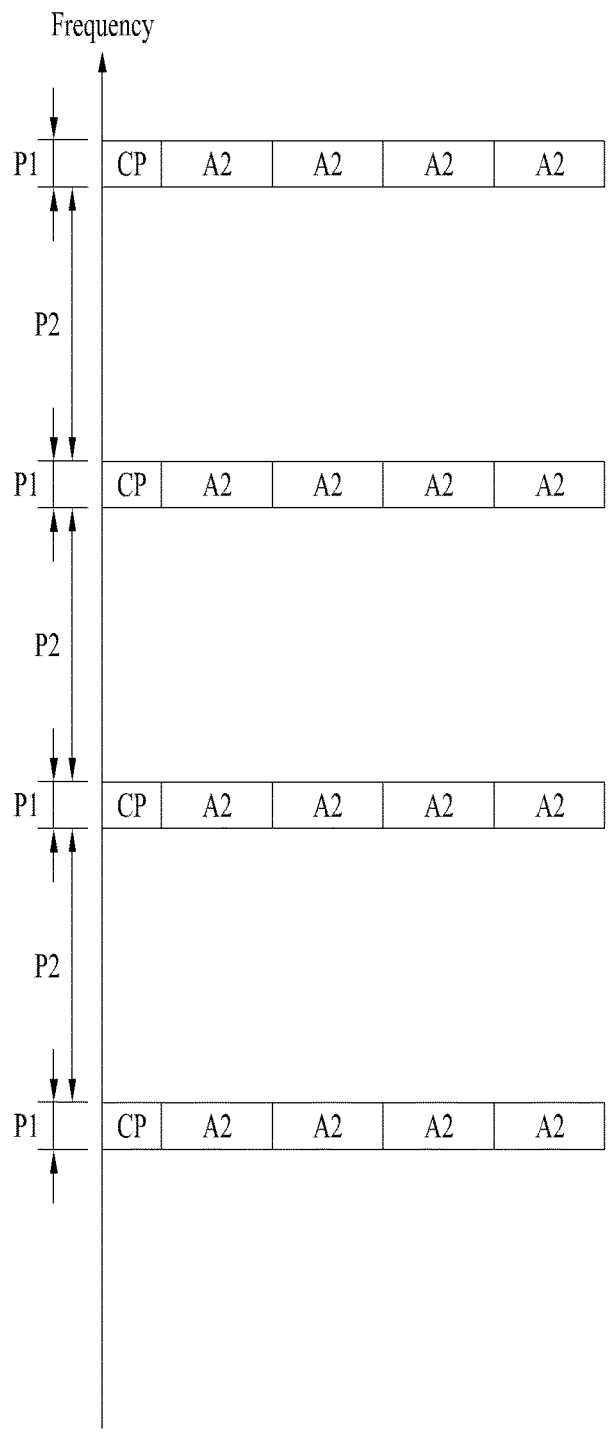
Figure 17:
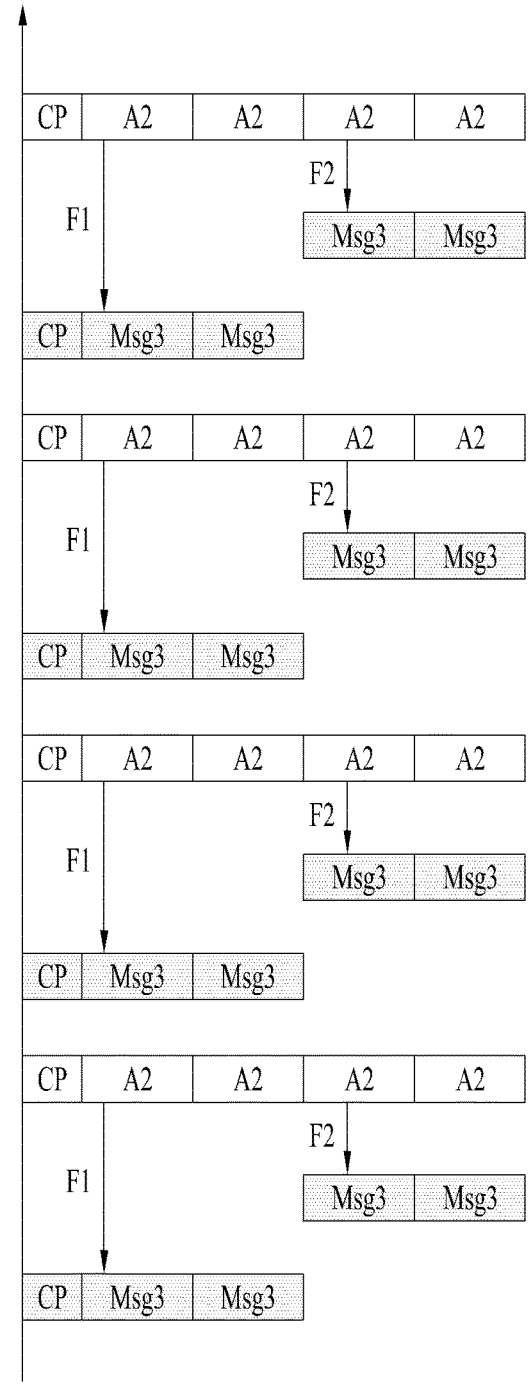

FIG. 17 is a simplified diagram illustrating an operation of transmitting PRACH format A2 and Msg3 by a UE according to another example of the present disclosure.

As illustrated in FIG. 17, the UE may transmit a PRACH preamble and Msg3 at a frequency spacing of F1 between them during a predetermined number of symbols and at a changed frequency spacing of F2 between them after the predetermined number of symbols.

The value of F2 may also be determined by a function of {the starting and/or ending RB index of P1, P2, a UE ID, a cell ID, a preamble sequence number (i.e., a preamble index or RAPID), a preamble retransmission number, a power ramping counter, a CWS, or a selected backoff counter value for the PRACH}.

In a more specific example, the F2 value may be determined by modulo (a preamble sequence number (i.e., a preamble index or an RAPID)+constant value, P2) or modulo (a preamble sequence number (i.e., a preamble index or an RAPID)+a power ramping counter+constant value, P2). The constant value may be predefined or configured by cell-specific (UE-specific) RRC signaling or L1 signaling. The F2 value may be predefined or configured by cell-specific (UE-specific) RRC signaling or L1 signaling.

According to another embodiment of the present disclosure, there are a plurality of frequency area resources (including a hopping frequency resource area) for Msg3 transmission, and one of the frequency area resources may be determined by a function of {the starting and/or ending RB index of P1 and/or P2 (or PRACH transmission time/frequency resources), a UE ID, a cell ID, a preamble sequence number (i.e., a preamble index or RAPID), a preamble retransmission number, a power ramping counter, a CWS, or a selected backoff counter value for the PRACH}. The frequency area resources for Msg3 transmission may be configured by cell-specific RRC signaling and/or UE-specific RRC signaling and/or L1 signaling.

4.2.2. Second Random Access Method

In this subclause, a detailed description will be given of a random access method in which a UE transmits a PRACH preamble and Msg3 in TDM. The UE may transmit Msg3 repeatedly on a symbol basis (e.g., symbol repetition) in the UL data transmission method which has been described before in subclause 4.1.

In this case, a plurality of PRACH occasions may be configured in the same slot.

Figure 18:
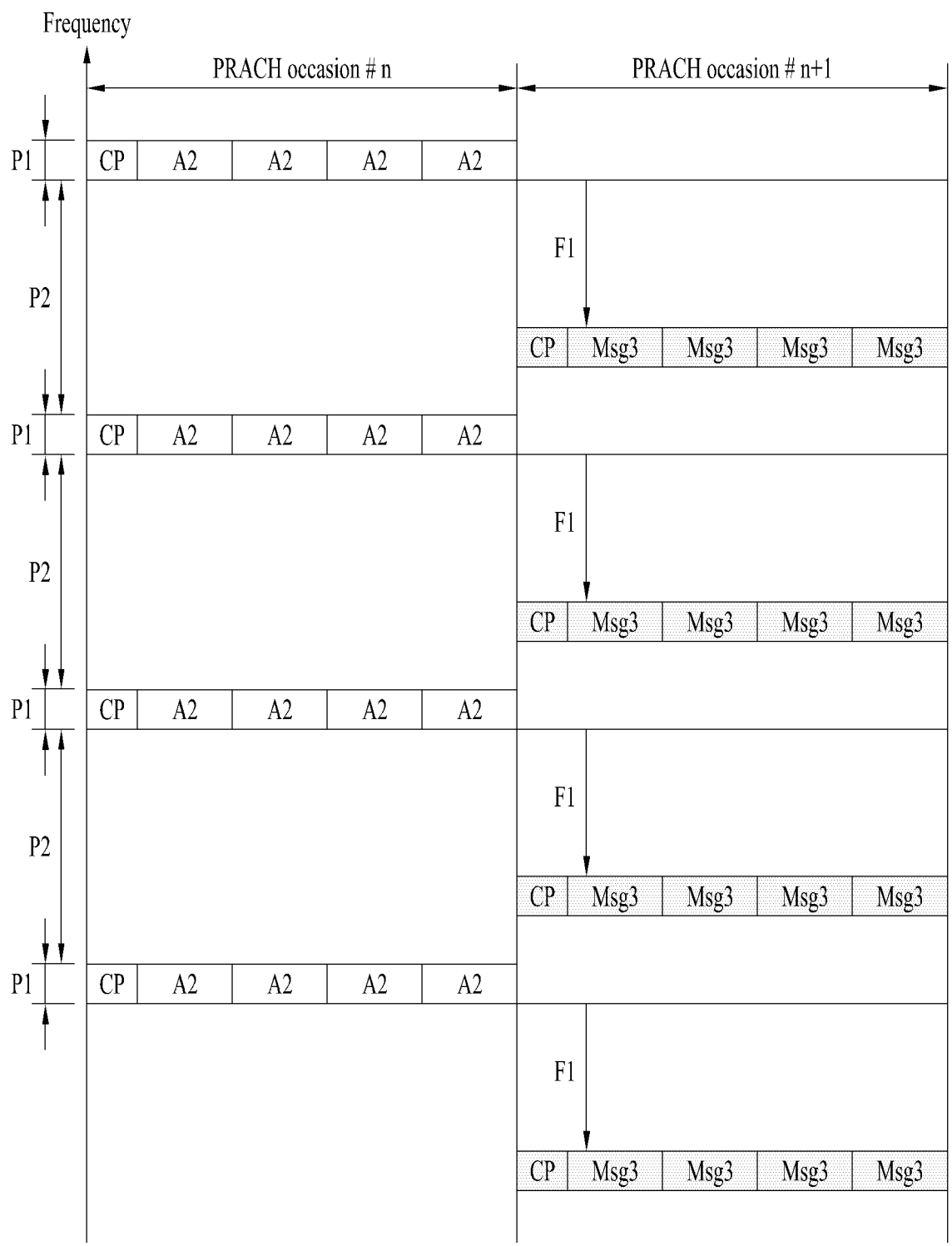

FIG. 18 is a simplified diagram illustrating an operation of transmitting PRACH format A2 and Msg3 by a UE according to another example of the present disclosure.

As illustrated in FIG. 18, the UE may transmit a PRACH preamble in PRACH occasion # n and then attempt to transmit Msg3 in the next PRACH occasion # n+1. The time-axis configuration of Msg3 may be identical to that of the PRACH transmitted in PRACH occasion # n or to that of the PRACH format in PRACH occasion # n (when there is a preconfigured PRACH format for PRACH occasion # n+1).

In FIG. 18, it is assumed that both of PRACH format # n and PRACH format # n+1 are based on the time-axis configuration of PRACH format A2.

Alternatively, the time-axis configuration of Msg3 may be preconfigured irrespective of the PRACH transmitted in PRACH occasion # n. For example, the time-axis configuration of Msg3 may be identical to that of a specific PRACH format.

Figure 19:
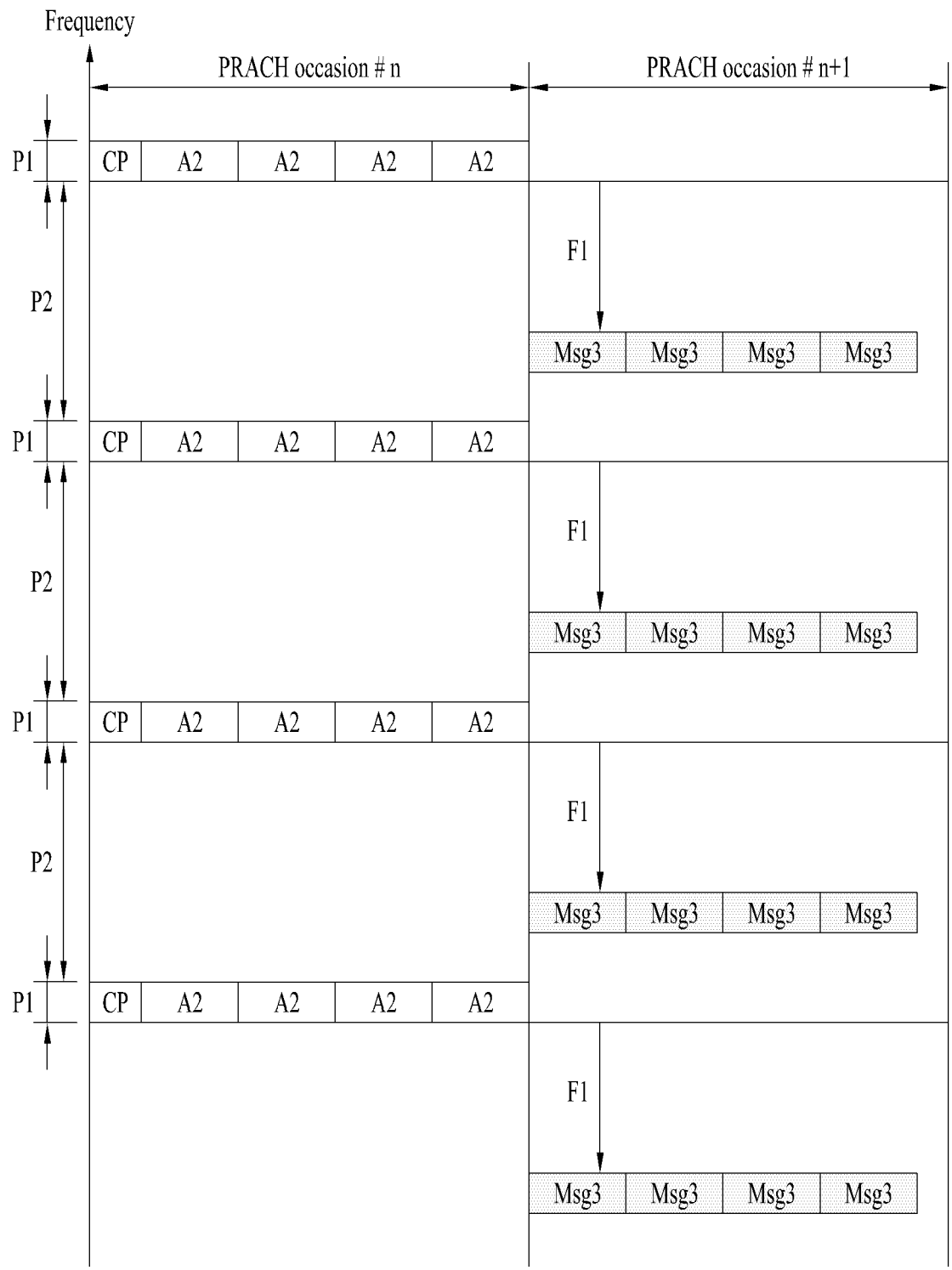

FIG. 19 is a simplified diagram illustrating an operation of transmitting PRACH format A2 and Msg3 by a UE according to another example of the present disclosure.

As illustrated in FIG. 19, Msg3 configured to span one symbol without a CP may be transmitted repeatedly in each symbol. Further, Msg3 transmitted in TDM with a PRACH preamble may not carry the DM-RS. Whether to transmit the DM-RS may be configured by a broadcast channel such as an SIB or determined by an F1 value determined according to the later-described method (e.g., when the F1 value is equal to or larger than a specific value, DM-RS transmission is configured).

An offset of F1 from the frequency-axis resources of the PRACH preamble may be applied to the frequency-axis resources of Msg3 transmitted in TDM with the PRACH preamble.

Similarly to the above-described second UL data transmission method, the F1 value may be predefined, signaled UE-specifically, or determined by a function of {the starting and/or ending RB index of P1, P2, a UE ID, a cell ID, a preamble sequence number (i.e., a preamble index or RAPID), a preamble retransmission number, a power ramping counter, a CWS, or a selected backoff counter value for the PRACH}.

In a more specific example, the F1 value may be determined by modulo (a preamble sequence number (i.e., a preamble index or an RAPID), P2) or modulo (a preamble sequence number (i.e., a preamble index or an RAPID)+a power ramping counter, P2). Alternatively, the F1 value may be predefined or configured by cell-specific (UE-specific) RRC signaling or L1 signaling. Alternatively, the F1 value may be set to zero.

According to the present disclosure, when a specific condition (e.g., F=0) is satisfied, Msg3 multiplexed in TDM with the PRACH preamble may be transmitted in the structure of CP+PUSCH1+CP+PUSCH2 . . . without symbol repetition which is performed in the foregoing first UL data transmission method, with no regard to FDM with another UE. PUSCH1/2/ . . . may be transmitted in frequency resources of a total system band (or a total subband or a configured total bandwidth part), instead of an interlaced structure.

Besides, as is done in the second UL data transmission method described before, the UE may transmit the PRACH preamble and Msg3 at a frequency spacing of F1 between them for a predetermined number of symbols and at a frequency spacing of F2 between them after the predetermined number of symbols.

The value of F2 may also be determined by a function of (the starting and/or ending RB index of P1, P2, a UE ID, a cell ID, a preamble sequence number (i.e., a preamble index or RAPID), a preamble retransmission number, a power ramping counter, a CWS, or a selected backoff counter value for the PRACH). For example, the F2 value may be determined by modulo (a preamble sequence number (i.e., a preamble index or an RAPID)+constant value, P2) or modulo (a preamble sequence number (i.e., a preamble index or an RAPID)+a power ramping counter+constant value, P2). The constant value may be predefined or configured by (cell-specific or UE-specific) RRC signaling or L1 signaling. The F2 value may be predefined or configured by (cell-specific or UE-specific) RRC signaling or L1 signaling.

Figure 20:
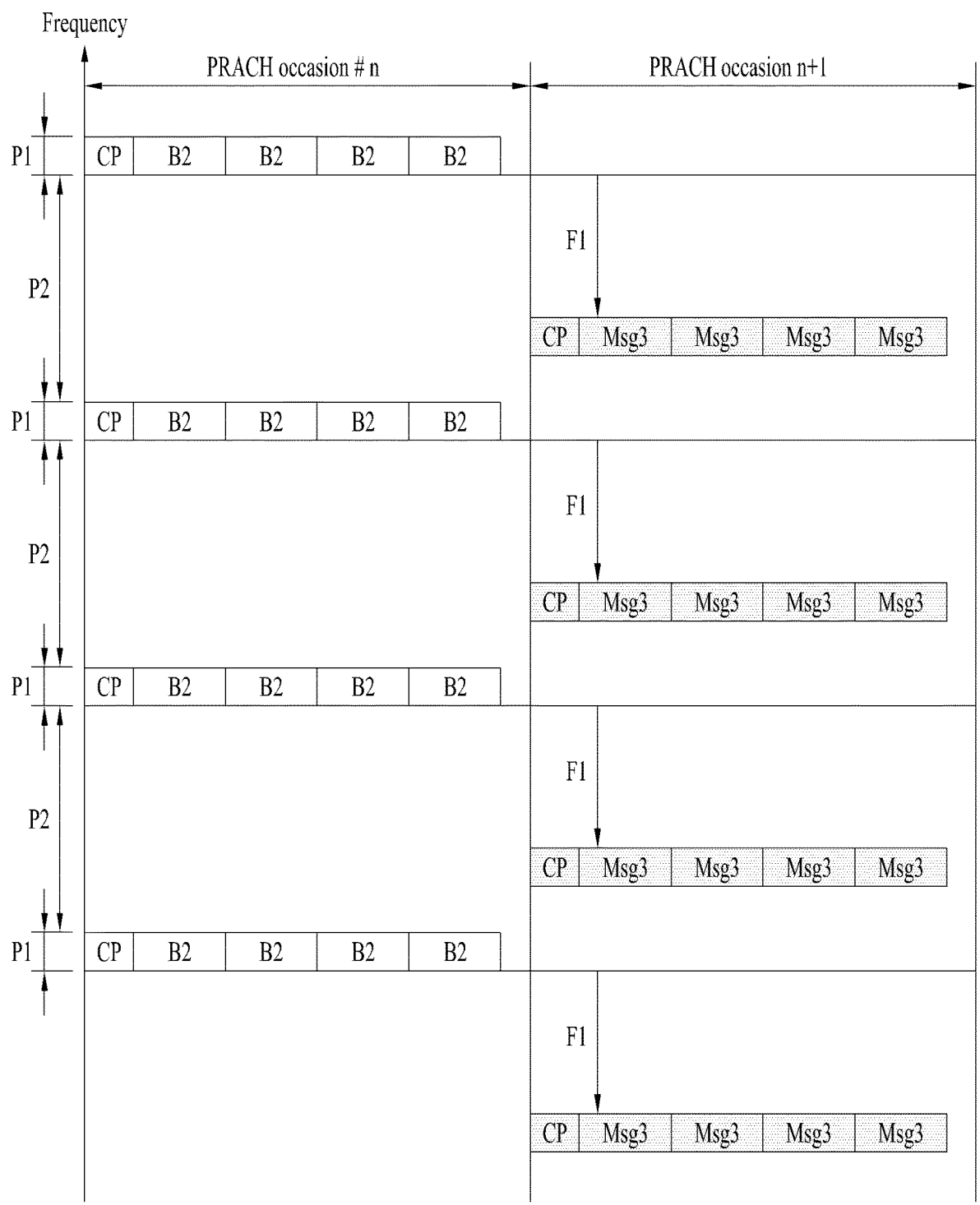

FIG. 20 is a simplified diagram illustrating an operation of transmitting PRACH format A2 and Msg3 by a UE according to another example of the present disclosure.

When PRACH format B and/or PRACH format C is applied to a PRACH preamble, there may be a GP between PRACH occasions. In this case, the UE may transmit Msg3 by emptying the GP as illustrated in FIG. 20.

However, when an additional CAP is needed to transmit a non-continuous signal as in signal transmission in an unlicensed band, upon failure in the CAP (or LBT) during the GP, the UE may not attempt to transmit Msg3.

Accordingly, when there is a GP between PRACH occasions and Msg3 is transmitted in TDM in the next PRACH occasion, the UE may continue transmitting the PRACH preamble during the GP, while satisfying phase continuity, extend the CP of Msg3 to be transmitted in the next PRACH occasion and transmit the extended CP during the GP, or start to transmit Msg3 from the ending time of the PRACH preamble by shifting the starting time of Msg3.

While only the case in which a PRACH preamble and Msg3 are multiplexed in TDM in different PRACH occasions in the same slot has been considered in the above-described configurations, the configurations may also be extended to TDM between a PRACH preamble and Msg3 in different slots.

For example, the UE may transmit the PRACH preamble in slot # n and Msg3 in slot # n+k (e.g., k=1). Herein, the UE may transmit Msg3 in the UL data transmission method described in subclause 4.1. Further, the frequency-axis resources and/or time-axis configuration of Msg3 in slot # n+k (e.g., k=1) may be configured according to the method described before in subclause 4.2.2.

Further, there may be a GP between the PRACH preamble and Msg3. In this case, the UE may transmit Msg3 by emptying the GP, continue transmitting Msg3 during the GP, while satisfying phase continuity, extend the CP of Msg3 to be transmitted in the next PRACH occasion and transmit the extended CP during the GP, or start to transmit Msg3 from the ending time of the PRACH preamble by shifting the starting time of Msg3.

In the present disclosure, there may be a plurality of time/frequency area resources (including a hopping frequency resource area) for Msg3 transmission, and one of the time/frequency area resources may be determined by a function of {the starting and/or ending RB index of P1 and/or P2 (or PRACH transmission time/frequency resources), a UE ID, a cell ID, a preamble sequence number (i.e., a preamble index or RAPID), a preamble retransmission number, a power ramping counter, a CWS, or a selected backoff counter value for the PRACH}. The time/frequency area resources for Msg3 transmission may be configured by cell-specific RRC signaling and/or UE-specific RRC signaling and/or L1 signaling.

Further, the UE may achieve a frequency diversity gain, further decreasing an Msg3 collision probability by frequency-hopping Msg3 (or as the BS instructs the UE to perform frequency hopping on Msg3).

Characteristically, it may be determined whether the frequency hopping is performed according to a retransmission number of an RACH preamble. For example, only when the retransmission number of the RACH preamble is equal to or less than a specific value (predefined or indicated by RRC signaling), the frequency hopping may be performed.

The random access methods described in subclauses 4.2.1. and 4.2.2. may be applied restrictively only when the PRACH retransmission counter value or the PRACH power ramping counter value is equal to or less than a specific value.

Therefore, when the PRACH retransmission counter value or the PRACH power ramping counter value is larger than the specific value, the UE may transmit only the PRACH preamble, instead of simultaneously transmitting the PRACH preamble and Msg3.

Alternatively, when the PRACH retransmission counter value or the PRACH power ramping counter value is equal to or less than the specific value, the UE may transmit the PRACH preamble and Msg3 in FDM as in the random access method of subclause 4.2.1., whereas when the PRACH retransmission counter value or the PRACH power ramping counter value is larger than the specific value, the UE may transmit the PRACH preamble and Msg3 in TDM as in the random access method of subclause 4.2.2.

In the above configurations, the UE may transmit Msg3 with the same power value as that of the PRACH. In other words, the UE may transmit the PRACH and Msg3 based on the same power value.

However, when the UE transmits the PRACH preamble and Msg3 in FDM, the same power value may not be applied to the PRACH preamble and Msg3 in some cases (e.g., when the sum of power values of the PRACH preamble and Msg3 exceeds P_max or the like). In this case, the UE may drop the Msg3 transmission, or transmit Msg3 by applying the remaining power to Msg3 after power is first applied to the PRACH preamble.

Alternatively, when the UE is capable of applying the same power value to the PRACH preamble and Msg3, the UE may transmit the PRACH preamble and Msg3 in FDM as in the random access method of subclause 4.2.1., whereas when the UE is not capable of applying the same power value to the PRACH preamble and Msg3, the UE may transmit the PRACH preamble and Msg3 in TDM as in the random access method of subclause 4.2.2.

The above configuration may further be generalized such that TDM or FDM between the PRACH preamble and Msg3 is determined according to a power value to be applied to the PRACH preamble.

For example, when the power value to be applied to the PRACH preamble is equal to or less than a specific value, the UE may transmit the PRACH preamble and Msg3 in FDM as in the random access method of subclause 4.2.1., whereas when the power value to be applied to the PRACH preamble is larger than the specific value, the UE may transmit the PRACH preamble and Msg3 in TDM as in the random access method of subclause 4.2.2.

Alternatively, TDM or FDM between the PRACH preamble and Msg3 is determined according to a reference signal received power (RSRP) value measured by the UE.

For example, when the measured RSRP value is equal to or larger than a specific value, the UE may transmit the PRACH preamble and Msg3 in FDM as in the random access method of subclause 4.2.1. (because power for the PRACH preamble may be small), whereas when the measured RSRP value is less than the specific value, the UE may transmit the PRACH preamble and Msg3 in TDM as in the random access method of subclause 4.2.2.

Alternatively, whether the UE is to transmit the PRACH preamble and Msg3 in FDM as described in subclause 4.2.1.

or in TDM as described in subclause 4.2.2. (or the UE is to transmit only the PRACH preamble) may be configured by cell-specific RRC signaling, UE-specific RRC signaling, or L1 signaling.

The corresponding configuration may vary according to a PRACH occasion. That is, it may be configured that the PRACH preamble and Msg3 are transmitted in a PRACH occasion in FDM as described in subclause 4.2.1. and in another PRACH occasion in TDM as described in subclause 4.2.2.

The 2-step RACH procedure proposed in the present disclosure, in which a random access procedure may be completed simply by simultaneous transmission of Msg1 and Msg3 (without Msg2 reception) and transmission of a response for Msg1 and Msg3, may be allowed only for a UE having beam correspondence (i.e., a UE having a capability for beam reciprocity).

On the contrary, a UE which does not have beam correspondence (i.e., a UE which does not have a capability for beam reciprocity) may perform only the legacy RACH procedure through 4-way handshaking, instead of the 2-step RACH procedure. This is because even though the UE which does not have beam correspondence detects the best BS transmission (Tx) beam, the UE may have difficulty in detecting a UE Tx beam corresponding to the BS Tx beam and thus it is inefficient for the UE to transmit Msg3 immediately without receiving Msg2.

Alternatively, the 2-step RACH procedure proposed in the present disclosure, in which a random access procedure may be completed simply by simultaneous transmission of Msg1 and Msg3 (without Msg2 reception) and transmission of a response for Msg1 and Msg3, may be allowed only for a UE attempting initial access in a corresponding unlicensed carrier (or a UE operating in stand-alone mode in the unlicensed carrier without an aid from a licensed band or a UE which is to camp on a corresponding unlicensed carrier as a PCell or PSCell).

Additionally, Msg3 in the 2-step RACH procedure proposed in the present disclosure and Msg3 in the 4-step RACH procedure may be different from each other in terms of format/content. For example, Msg3 in the 2-step RACH procedure proposed in the present disclosure may be generalized such that Msg3 is defined as UL data transmitted in a multiplexing scheme such as FDM/TDM with an RACH preamble.

Further, a structure in which the same information is repeated in all symbols of one UL data channel or a structure in which the same information/signal is repeated only in some symbol group of one UL data channel may be applied to the methods of repeated transmission during a predetermined symbol duration (.e., 1-symbol repetition transmission) described before in subclauses 4.2.1. and 4.2.2.

For example, in the 1-symbol repetition transmission structure according to an embodiment of the present disclosure, when 3 symbol groups each including 2 symbols are defined for a UL data channel including 6 symbols, only 2 symbols (or only one symbol) of each group may be repeated.

In the above configuration, one symbol group may include only the DM-RS. The number of symbols in a symbol group or the number of symbol groups may be predefined or configured/indicated by RRC signaling (a MAC control element (CE) or L1 signaling). A symbol group may be defined on a hopping unit basis.

For transmission of Msg1 and Msg3 in the 2-step RACH procedure proposed in the present disclosure (for the convenience of description, Msg3 in the 2-step RACH procedure proposed in the present disclosure is referred to as MsgA to be distinguishable from Msg3 defined in the legacy LTE system) or for transmission of Msg1 in the 4-step RACH procedure, an allowed RACH occasion may be defined according to a specific parameter value, For example, a different allowed RACH occasion may be configured according to the magnitude of the transmission power of MsgA and/or Msg1. In a specific example, only when the magnitude of the transmission power of MsgA and/or Msg1 is equal to or less than P1, transmission of MsgA and/or Msg1 may be allowed in a specific RACH occasion # n.

When it is said that the magnitude of the transmission power of MsgA and/or Msg1 is large, this may mean that the UE transmitting the message is located at a cell edge. Thus, it may be configured that multiplexing with another UL channel to which a timing advance (TA) is applied is avoided in an RACH occasion associated with large transmission power in consideration of such a cell-edge UE. Therefore, the cell-edge UE may have an increased transmission probability of MsgA and/or Msg1.

In another example, a different allowed RACH occasion may be configured according to an RSRP. In a specific example, only when a measured RSRP is equal to or less than R1, transmission of MsgA and/or Msg1 may be allowed in a specific RACH occasion # m.

In another example, a linked RACH occasion may be configured differently according to the value of an LBT parameter (e.g., an energy detection threshold, a contention window size, or the like) for an LBT operation performed before transmission of MsgA and/or Msg1.

As described above, allowed RACH occasions for MsgA and/or Msg1 transmission may be defined for specific parameter values, so that the UE may select a specific RACH occasion according to a corresponding parameter value. Alternatively, RACH occasions linked to specific parameter values may be defined for MsgA and/or Msg1 transmission, and the BS may indicate MsgA and/or Msg1 transmission in a specific RACH occasion by DCI (or a MAC CE). Therefore, the BS may indicate the UE to use a linked specific parameter for the MsgA and/or Msg1 transmission.

For example, different linked RACH occasions may be configured according to LBT parameter values (e.g., energy detection thresholds, contention window sizes, or the like) for an LBT operation performed before MsgA and/or Msg1 transmission. Then, when a specific RACH occasion is indicated for MsgA and/or Msg1 transmission by DCI, the UE may perform LBT using an LBT parameter configured for a corresponding RACH occasion.

Alternatively, RACH occasions linked to specific parameter values may be defined for MsgA and/or Msg1 transmission, and the BS may indicate MsgA and/or Msg1 transmission based on a specific parameter value by DCI (or a MC CE). Therefore, the BS may indicate MsgA and/or Msg1 transmission in a linked specific RACH occasion (using a corresponding parameter value).

4.3. Conclusion

Figure 21:
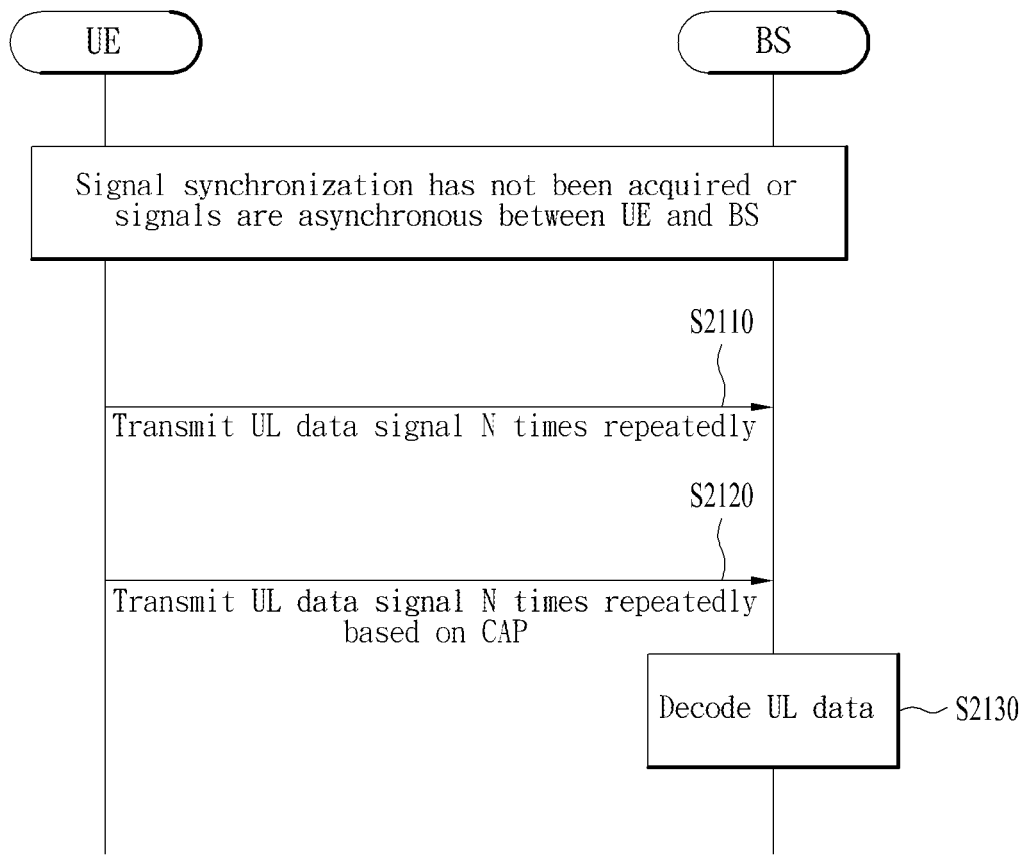
FIG. 21 is a diagram illustrating a signal flow for an operation of transmitting and receiving UL data between a UE and a base station (BS), which is applicable to the present disclosure.
Figure 22:
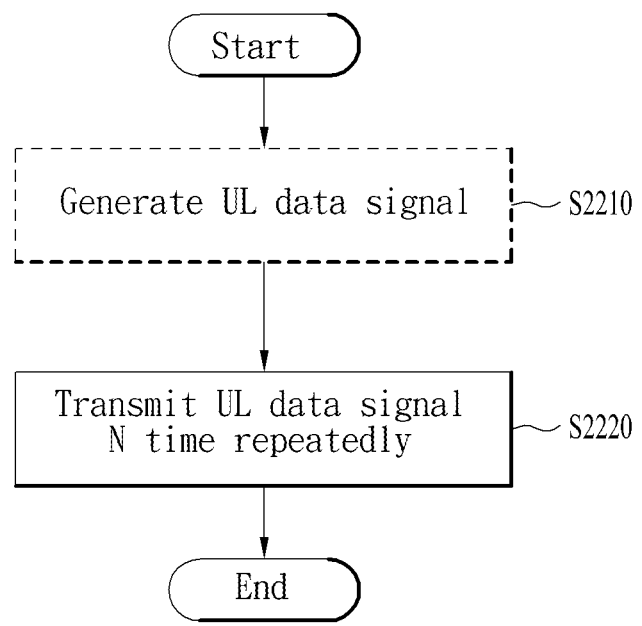
FIG. 22 is a flowchart illustrating a UL data transmission method of a UE, which is applicable to the present disclosure.
Figure 23:
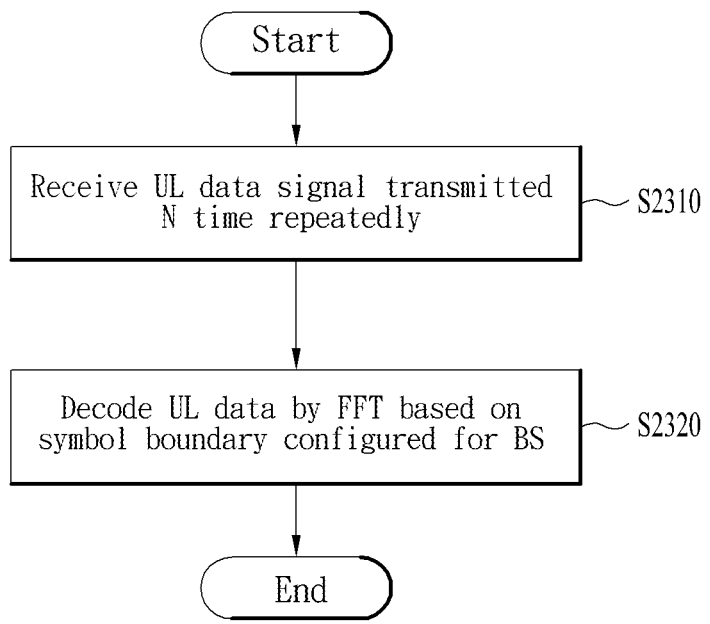
FIG. 23 is a flowchart illustrating a UL data reception method of a BS, which is applicable to the present disclosure.

FIG. 21 is a diagram illustrating a signal flow for an operation of transmitting and receiving UL data between a UE and a BS, which is applicable to the present disclosure, FIG. 22 is a flowchart illustrating a UL data transmission method of a UE, which is applicable to the present disclosure, and FIG. 23 is a flowchart illustrating a UL data reception method of a BS, which is applicable to the present disclosure.

In the operation of transmitting and receiving UL data between a UE and a BS, which is applicable to the present disclosure, it is assumed that signal synchronization has not been performed or signals are asynchronous between the UE and the BS.

The UE may generate a UL data signal to be transmitted (S2210). In the present disclosure, this operation is optionally applicable. According to another embodiment of the present disclosure, the UE may transmit the UL data signal N times repeatedly without generating UL data signals.

Subsequently, with no signal synchronization with the BS acquired (in other words, before signal synchronization with the BS), the UE transmits the UL data signal N times repeatedly to the BS (S2110, S2120, and S2220). The UL data signal may be configured to span a predetermined symbol duration, and N may be a natural number equal to or larger than 2.

In response to the above operation, the BS receives the UL data signal that has been transmitted N times repeatedly from the UE (S2310).

UL data transmission and reception proposed in the present disclosure is applicable to an unlicensed band as well as a licensed band. In the licensed band, therefore, the UE may simply transmit the UL data signal N times repeatedly (S2110), whereas in the unlicensed band, the UE may transmit the UL data signal N times repeatedly based on a CAP for the unlicensed band (S2120).

In correspondence with the above operation, the BS may decode UL data from the received UL data signal by FFT (S2130 and S2320). The FFT operation may be performed based on a symbol boundary configured for the BS.

Therefore, in spite of no knowledge of the starting transmission time of the UL data signal from the UE or an expected reception time of the UL data signal, the BS may receive the UL data signal through FFT on the assumption of an existing symbol boundary for Sym #1/2/3. A preceding repeated signal serves as a CP so that the BS may decode the UL signal of the UE.

In this configuration, the predetermined symbol duration of the UL data signal may be a 1-symbol duration.

Further, the UL data signal may include UL data information and a DM-RS in FDM.

N may be determined in a predetermined rule or configured by higher-layer signaling.

According to some embodiments of the present disclosure, the UL data signal may be transmitted without a CP.

When the UL data signal is a UL signal for random access, the UE may transmit the UL data signal and a PRACH preamble in FDM or TDM.

For example, when the UL data signal is a UL signal for random access and is transmitted with the PRACH preamble in FDM, the frequency spacing between the UL data signal and the PRACH preamble may be determined in a predetermined rule.

In another example, when the UL data signal is a UL signal for random access and is transmitted with the PRACH preamble in TDM, the UL data signal and the PRACH preamble may be transmitted based on the same CP length and the same symbol repetition number.

In another example, when the UL data signal is a UL signal for random access and is transmitted with the PRACH preamble in FDM, the UL data signal may be transmitted frequency-hopped based on an $M^{th}$ repeated transmission time. M may be a natural number smaller than N.

In another example, when the UL data signal is a UL signal for random access and is transmitted with the PRACH preamble in TDM, the frequency spacing between the UL data signal and the PRACH preamble may be determined in a predetermined rule.

In the present disclosure, the UE may transmit the UL data signal and the PRACH preamble in FDM or TDM based on a transmission power value of the PRACH preamble.

Alternatively, the UE may transmit the UL data signal and the PRACH preamble in FDM or TDM based on a measured RSRP value.

Alternatively, the UE may transmit the UL data signal and the PRACH preamble in FDM or TDM based on a high-layer signaled configuration.

In another embodiment of the present disclosure, when the UL data signal is transmitted in an unlicensed band, the UE may transmit the UL data signal of the predetermined symbol duration N times repeatedly in the unlicensed band based on a CAP for the unlicensed band.

Since examples of the above proposed methods may be included as one of methods of implementing the present disclosure, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a predefined signal (or a physical-layer or higher-layer signal) by a BS.

5. APPARATUS CONFIGURATIONS

Figure 24:
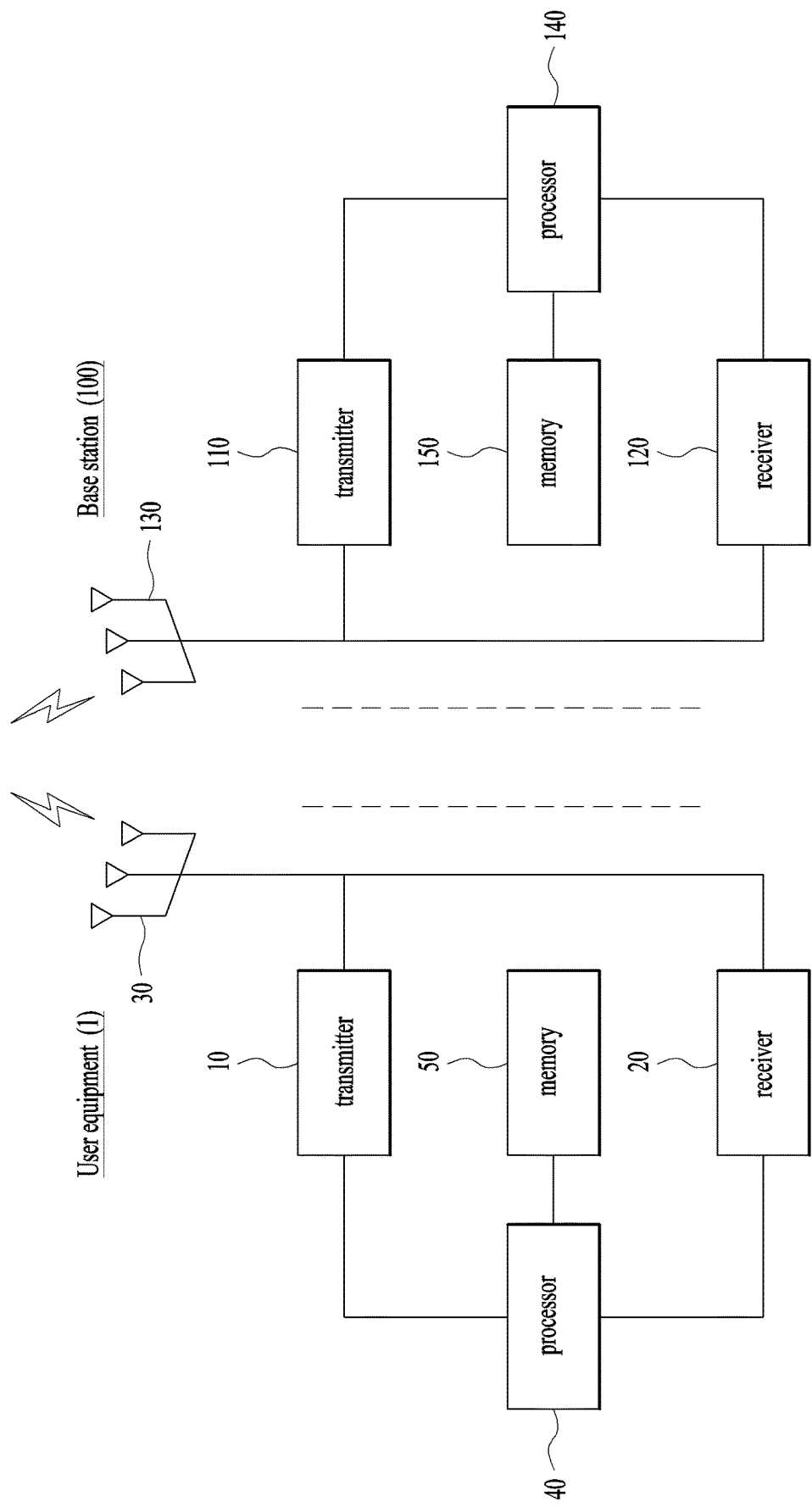
FIG. 24 is a block diagram of a UE and a BS (or an evolved Node B (eNB)) which may implement proposed embodiments of the present disclosure.

FIG. 24 is a block diagram of a UE and an eNB which may implement proposed embodiments of the present disclosure. The UE and the BS illustrated in FIG. 24 operate to implement the embodiments of a UL data transmission and reception method between a UE and a BS, which have been described before.

A UE 1 may operate as a transmitter on UL and as a receiver on DL. Further, an eNB (or gNB) 100 may operate as a receiver on UL and as a transmitter on DL.

That is, each of the UE 1 and the eNB 100 may include a transmitter 10 or 110 and a receiver 20 or 120 to control transmission and reception of information, data, and/or a message, and include an antenna 30 or 130 for transmitting and receiving information, data, and/or a message.

Further, the UE 1 and the eNB 100 may respectively include processors 40 and 140 which implement the embodiments of the present disclosure and memories 50 and 150 which temporarily or permanently processing of the processors 40 and 140.

The UE 1 having the above configuration may operate as follows.

The UE 1 may transmit a UL data signal of a predetermined symbol duration N times repeatedly through the processor 40 controlling the transmitter 10, before signal synchronization with the eNB 100. N may be a natural value equal to or larger than 2.

In correspondence with the above operation, the eNB 100 receives the UL data signal of the predetermined symbol duration which has been transmitted N times repeatedly from the UE through the processor 140 controlling the receiver 120, before signal synchronization with the UE. Subsequently, the eNB 100 decodes UL data from the received UL data signal by FFT. The FFT operation may be performed based on a symbol boundary configured for the eNB 100.

The transmitters and the receivers included in the UE and the eNB may perform packet modulation and demodulation, high-speed packet channel coding, OFDMA packet scheduling, TDD packet scheduling, and/or channelization, for data transmission. Further, each of the UE and the eNB illustrated in FIG. 24 may further include a low-power radio frequency (RF)/intermediate frequency (IF) unit.

In the present disclosure, a UE may be any of a personal digital assistant (PDA), a cellular phone, a personal communication service (PCS) phone, a GSM phone, a WCDMA phone, a mobile broadband system (MBS) phone, a handheld personal computer (PC), a laptop PC, a smartphone, a multi-mode-multi-band (MM-MB) terminal, and so on.

The smartphone refers to a terminal which has the advantages of both of a mobile communication terminal and a PDA, in which the functions of the PDA, such as scheduling, fax transmission and reception, and Internet connection are integrated in the mobile communication terminal. The MM-MB terminal refers to a terminal having a multi-model chip built therein, which may operate in all of a portable Internet system and other mobile communication systems (e.g., a CDMA2000 system, a WCDMA system, and so on).

The embodiments of the present disclosure may be implemented through various means, for example, in hardware, firmware, software, or a combination thereof.

In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and so on.

In a firmware or software configuration, the methods according to the embodiments of the present disclosure may be implemented in the form of a module, a procedure, a function, or the like. For example, software code may be stored in the memories 50 and 150 and executed by the processors 40 and 140. Each of the memories is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present disclosure are applicable to various wireless access systems such as a 3GPP or 3GPP2 system. The embodiments of the present disclosure are applicable to all technical fields in which the various wireless access systems find their applications as well as the various wireless access systems. Further, the proposed methods are also applicable to an mmWave communication system using an ultra-high frequency band.

The invention claimed is:

1. A method of transmitting uplink signal by a user equipment (UE) in a wireless communication system, the method comprising:
    receiving, from a base station (BS), configuration information for a random access procedure;
    transmitting, to the BS, a random access preamble based on the configuration information;
    transmitting, to the BS, a physical uplink shared channel (PUSCH); and
    receiving, from the BS, a physical downlink shared channel (PDSCH) in response to the PUSCH,
    wherein, based on frequency division multiplexing (FDM) or time division multiplexing (TDM), the PUSCH of a predetermined symbol duration are transmitted repeatedly with the random access preamble before signal synchronization with the BS.

2. The method according to claim 1,
wherein the PDSCH includes contention resolution information.

3. The method according to claim 1,
wherein the PUSCH includes uplink data information and a demodulation reference signal (DM-RS) based on FDM.

4. The method according to claim 1,
wherein the PUSCH is transmitted N times repeatedly and N is determined based on a predetermined rule or configured by higher-layer signaling.

5. The method according to claim 1,
wherein, based on the PUSCH being transmitted with the random access preamble by the FDM, the PUSCH is transmitted frequency-hopped with respect to an $M^{th}$ repeated transmission time and M is a natural number smaller than N.

6. The method according to claim 1,
wherein, based on the PUSCH and the random access preamble being transmitted based on FDM, a frequency spacing between the PUSCH and the random access preamble is configured based on a predetermined rule.

7. The method according to claim 1,
wherein, based on the PUSCH being transmitted with the random access preamble based on the FDM, the PUSCH and the random access preamble are transmitted based on the same cyclic prefix and the same symbol repetition number.

8. The method according to claim 1,
wherein, based on the PUSCH being transmitted with the random access preamble by the TDM, a frequency spacing between the PUSCH and the random access preamble is determined based on a predetermined rule.

9. The method according to claim 1,
wherein the PUSCH and the random access preamble are transmitted by the FDM or the TDM based on a transmission power value of the random access preamble.

10. The method according to claim 1,
wherein the PUSCH and the random access preamble are transmitted by the FDM or the TDM based on a measured reference signal received power (RSRP) value.

11. The method according to claim 1,
wherein whether the PUSCH and the random access preamble are transmitted based on FDM or TDM is determined based on a higher-layer signaling.

12. The method according to claim 1,
wherein the PUSCH is transmitted without a cyclic prefix.

13. The method according to claim 1,
wherein, based on the PUSCH being transmitted in an unlicensed band, the PUSCH of the predetermined symbol duration is transmitted repeatedly in the unlicensed band based on a channel access procedure (CAP) for the unlicensed band.

14. A user equipment (UE) for transmitting uplink data in a wireless communication system, the UE comprising:
at least one transceiver;
at least one processor; and
at least one computer memory operably connectable to the at least one processor and storing instructions that, when executed, causes the at least one processor to perform operations comprising:
receiving, from a base station (BS), configuration information for a random access procedure;
transmitting, to the BS, a random access preamble based on the configuration information;
transmitting, to the BS, a physical uplink shared channel (PUSCH); and
receiving, from the BS, a physical downlink shared channel (PDSCH) in response to the PUSCH,
wherein, based on frequency division multiplexing (FDM) or time division multiplexing (TDM), the PUSCH of a predetermined symbol duration are transmitted repeatedly with the random access preamble before signal synchronization with the BS.

15. A method of receiving uplink signal by a base station (BS) in a wireless communication system, the method comprising:
transmitting, to a user equipment (UE), configuration information for a random access procedure;
receiving, from the UE, a random access preamble based on the configuration information;
receiving, from the UE, a physical uplink shared channel (PUSCH); and
transmitting, to the UE, a physical downlink shared channel (PDSCH) in response to the PUSCH,
wherein, based on frequency division multiplexing (FDM) or time division multiplexing (TDM), the PUSCH of a predetermined symbol duration are received repeatedly with the random access preamble before signal synchronization with the UE.

* * * * *